(12) United States Patent
Shrivastava et al.

(10) Patent No.: US 11,703,814 B2
(45) Date of Patent: Jul. 18, 2023

(54) SECURITY EVENT DETECTION WITH SMART WINDOWS

(71) Applicant: View, Inc., Milpitas, CA (US)

(72) Inventors: Dhairya Shrivastava, Los Altos, CA (US); Stephen Clark Brown, San Mateo, CA (US); Gordon E. Jack, San Jose, CA (US); Horop Puth, San Jose, CA (US); Illayathambi Kunadian, San Jose, CA (US); Oner Bicakci, Fremont, CA (US); Sridhar Karthik Kailasam, Fremont, CA (US); Fabian Strong, Hayward, CA (US); Brandon Tinianov, Santa Clara, CA (US); Joseph Lunardi, Eastlake, OH (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 17/880,329

(22) Filed: Aug. 3, 2022

(65) Prior Publication Data
US 2022/0382224 A1 Dec. 1, 2022

Related U.S. Application Data

(63) Continuation of application No. 16/432,465, filed on Jun. 5, 2019, now Pat. No. 11,415,949, which is a
(Continued)

(51) Int. Cl.
*E06B 9/24* (2006.01)
*G02F 1/163* (2006.01)
(Continued)

(52) U.S. Cl.
CPC ............. *G05B 13/0265* (2013.01); *E06B 9/24* (2013.01); *G02F 1/163* (2013.01); *G05B 15/02* (2013.01);
(Continued)

(58) Field of Classification Search
None
See application file for complete search history.

(56) References Cited

U.S. PATENT DOCUMENTS 2,971,186 A 2/1961 Tony et al.
5,579,149 A 11/1996 Moret et al.
(Continued)

FOREIGN PATENT DOCUMENTS

CN 101553724 A 10/2009
CN 101911141 A 12/2010
(Continued)

OTHER PUBLICATIONS

CN Office Action dated Dec. 31, 2021, in Application No. CN201980038031.7 with English translation.
(Continued)

*Primary Examiner* — Isaac Tuku Tecklu
(74) *Attorney, Agent, or Firm* — Weaver Austin Villeneuve & Sampson LLP; Ryan James Otis

(57) ABSTRACT

Optically controllable windows and an associated window control system provide a building security platform. A window controller or other processing device can monitor for window breakage, cameras associated with windows can monitor for intruders, and transparent displays can provide alerts regarding detected activity within a building. A window control system can detect deviations from expected I/V characteristics of an optically controllable window during normal operation of the window (tint transitions, steady state conditions, etc.) and/or during application of a security-related perturbing event, and provide alerts upon their occurrence.

18 Claims, 11 Drawing Sheets

Related U.S. Application Data continuation-in-part of application No. 16/338,403, filed on Mar. 29, 2019, now Pat. No. 11,150,616, which is a continuation-in-part of application No. 16/254,434, filed on Jan. 22, 2019, now Pat. No. 11,073,800, which is a continuation-in-part of application No. 15/891,866, filed as application No. PCT/US2017/054120 on Sep. 28, 2017, now Pat. No. 10,908,470, which is a continuation of application No. 15/691,468, filed on Aug. 30, 2017, now Pat. No. 11,054,792, which is a continuation-in-part of application No. 15/534,175, filed on Jun. 8, 2017, now Pat. No. 10,514,963, which is a continuation-in-part of application No. 15/123,069, filed as application No. PCT/US2015/064555 on Dec. 8, 2015, now Pat. No. 10,859,983, which is a continuation of application No. 14/932,474, filed as application No. PCT/US2015/019031 on Mar. 5, 2015, now Pat. No. 9,927,674, which is a continuation-in-part of application No. 14/391,122, filed as application No. PCT/US2013/036456 on Apr. 12, 2013, now Pat. No. 10,365,531, which is a continuation of application No. 13/049,756, filed on Mar. 16, 2011, now Pat. No. 9,454,055.

(60) Provisional application No. 62/828,350, filed on Apr. 2, 2019, provisional application No. 62/760,335, filed on Nov. 13, 2018, provisional application No. 62/681,025, filed on Jun. 5, 2018, provisional application No. 62/403,605, filed on Oct. 3, 2016, provisional application No. 62/088,943, filed on Dec. 8, 2014, provisional application No. 61/974,677, filed on Apr. 3, 2014, provisional application No. 61/948,464, provisional application No. 61/624,175, filed on Apr. 13, 2012.

(51) Int. Cl.
  *G05B 13/02* (2006.01)
  *G05B 15/02* (2006.01)

(52) U.S. Cl.
  CPC ............... *E06B 2009/2417* (2013.01); *E06B 2009/2464* (2013.01); *G05B 2219/2642* (2013.01)

(56) References Cited

U.S. PATENT DOCUMENTS

| | | | |
|---|---|---|---|
| 5,705,983 A | 1/1998 | Tweadey, II et al. | |
| 6,794,882 B2 | 9/2004 | Jessup | |
| 6,829,511 B2 | 12/2004 | Bechtel et al. | |
| 7,133,181 B2 | 11/2006 | Greer | |
| 7,161,483 B2 | 1/2007 | Chung | |
| 7,684,105 B2 | 3/2010 | Lamontagne et al. | |
| 8,213,074 B1 | 7/2012 | Shrivastava et al. | |
| 8,219,217 B2 | 7/2012 | Bechtel et al. | |
| 8,254,013 B2 | 8/2012 | Mehtani et al. | |
| 8,705,162 B2 | 4/2014 | Brown et al. | |
| 8,764,950 B2 | 7/2014 | Wang et al. | |
| 9,081,246 B2 | 7/2015 | Rozbicki | |
| 9,454,055 B2 | 9/2016 | Brown et al. | |
| 9,677,327 B1* | 6/2017 | Nagel | G02F 1/163 |
| 9,885,935 B2 | 2/2018 | Jack et al. | |
| 10,299,101 B1 | 5/2019 | Lim et al. | |
| 10,329,839 B2 | 6/2019 | Fasi et al. | |
| 10,387,221 B2 | 8/2019 | Shrivastava et al. | |
| 10,942,413 B2 | 3/2021 | Vigano et al. | |
| 10,949,267 B2 | 3/2021 | Shrivastava et al. | |
| 11,137,658 B2 | 10/2021 | Brown et al. | |
| 11,415,949 B2 | 8/2022 | Shrivastava et al. | |
| 2002/0015214 A1 | 2/2002 | Nishikitani et al. | |
| 2002/0021481 A1 | 2/2002 | Lin et al. | |
| 2004/0215520 A1 | 10/2004 | Butler et al. | |
| 2005/0046563 A1 | 3/2005 | Whitney | |
| 2006/0255922 A1 | 11/2006 | Taki et al. | |
| 2007/0053053 A1* | 3/2007 | Moskowitz | G02F 1/172 359/296 |
| 2007/0086084 A1* | 4/2007 | Mori | G08B 13/04 359/362 |
| 2008/0011864 A1 | 1/2008 | Tessier et al. | |
| 2008/0150555 A1 | 6/2008 | Wang et al. | |
| 2008/0196331 A1 | 8/2008 | Boyd | |
| 2009/0020233 A1 | 1/2009 | Berman et al. | |
| 2009/0324010 A1 | 12/2009 | Hou | |
| 2010/0243427 A1 | 9/2010 | Kozlowski et al. | |
| 2010/0245973 A1 | 9/2010 | Wang et al. | |
| 2010/0265089 A1 | 10/2010 | Gregory | |
| 2011/0087988 A1 | 4/2011 | Ray et al. | |
| 2011/0266137 A1 | 11/2011 | Wang et al. | |
| 2011/0266138 A1 | 11/2011 | Wang et al. | |
| 2011/0267674 A1 | 11/2011 | Wang et al. | |
| 2011/0267675 A1 | 11/2011 | Wang et al. | |
| 2012/0033287 A1 | 2/2012 | Friedman et al. | |
| 2012/0062975 A1 | 3/2012 | Mehtani et al. | |
| 2012/0188627 A1 | 7/2012 | Chen et al. | |
| 2012/0229275 A1 | 9/2012 | Mattern | |
| 2012/0236386 A1 | 9/2012 | Mehtani et al. | |
| 2012/0239209 A1* | 9/2012 | Brown | E06B 9/24 359/275 |
| 2012/0275008 A1 | 11/2012 | Pradhan et al. | |
| 2013/0063065 A1 | 3/2013 | Berman et al. | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Pradhan et al. | |
| 2014/0313032 A1 | 10/2014 | Sager et al. | |
| 2014/0368899 A1 | 12/2014 | Greer | |
| 2015/0116811 A1 | 4/2015 | Shrivastava et al. | |
| 2015/0338713 A1 | 11/2015 | Brown | |
| 2016/0154290 A1 | 6/2016 | Brown et al. | |
| 2016/0203403 A1 | 7/2016 | Nagel et al. | |
| 2017/0097259 A1 | 4/2017 | Brown et al. | |
| 2017/0097553 A1 | 4/2017 | Jack et al. | |
| 2018/0129172 A1 | 5/2018 | Shrivastava et al. | |
| 2018/0187478 A1 | 7/2018 | Vigano et al. | |
| 2018/0188628 A1 | 7/2018 | Brown et al. | |
| 2018/0189117 A1 | 7/2018 | Shrivastava et al. | |
| 2018/0284555 A1 | 10/2018 | Klawuhn et al. | |
| 2019/0011798 A9 | 1/2019 | Brown et al. | |
| 2019/0025661 A9 | 1/2019 | Brown et al. | |
| 2019/0317458 A1 | 10/2019 | Shrivastava et al. | |
| 2019/0384652 A1 | 12/2019 | Shrivastava et al. | |
| 2019/0391419 A1 | 12/2019 | De Jong et al. | |
| 2020/0265089 A1 | 8/2020 | Zhang et al. | |
| 2021/0018880 A9 | 1/2021 | Shrivastava et al. | |
| 2021/0397060 A1 | 12/2021 | Brown et al. | |

FOREIGN PATENT DOCUMENTS

| | | |
|---|---|---|
| CN | 111354169 A | 6/2020 |
| DE | 2933371 A1 | 3/1981 |
| EP | 3104352 A1 | 12/2016 |
| GB | 2169426 A | 7/1986 |
| WO | WO-8906302 A1 | 7/1989 |
| WO | WO-2009087169 A1 | 7/2009 |
| WO | WO-2013155467 A1 | 10/2013 |
| WO | WO-2014082092 A1 | 5/2014 |
| WO | WO-2014209812 A1 | 12/2014 |
| WO | WO-2016004109 A1 | 1/2016 |
| WO | WO-2016085964 A1 | 6/2016 |
| WO | WO-2017062592 A1 | 4/2017 |
| WO | WO-2017075059 A1 | 5/2017 |
| WO | WO-2017155833 A1 | 9/2017 |
| WO | WO-2017189307 A2 | 11/2017 |
| WO | WO-2017192881 A1 | 11/2017 |
| WO | WO-2018098089 A1 | 5/2018 |
| WO | WO-2018112241 A1 | 6/2018 |
| WO | WO-2018200740 A2 | 11/2018 |
| WO | WO-2018200752 A1 | 11/2018 |

(56) References Cited

FOREIGN PATENT DOCUMENTS

OTHER PUBLICATIONS

CN Office Action dated Jun. 17, 2022, in Application No. CN201980038031.7 with English translation.
International Preliminary Report on Patentability dated Dec. 17, 2020 in PCT Application No. PCT/US2019/035544.
International Search Report and Written Opinion (ISA/EP) dated Nov. 5, 2019, in PCT Application No. PCT/US2019/035544.
U.S. Advisory Action dated Jul. 17, 2020 in U.S. Appl. No. 15/910,931.
U.S. Final Office Action dated Dec. 2, 2020 in U.S. Appl. No. 15/910,925.
U.S. Final Office Action dated May 5, 2020 in U.S. Appl. No. 15/910,925.
U.S. Notice of Allowance dated Apr. 17, 2019 in U.S. Appl. No. 15/910,936.
U.S. Notice of Allowance dated Dec. 14, 2018 in U.S. Appl. No. 15/910,936.
U.S. Notice of Allowance dated Dec. 31, 2020 in U.S. Appl. No. 16/555,377.
U.S. Notice of Allowance dated Dec. 4, 2020 in U.S. Appl. No. 15/910,931.
U.S. Notice of Allowance dated Jul. 19, 2022, in U.S. Appl. No. 16/432,465.
U.S. Notice of Allowance dated Jun. 21, 2021 in U.S. Appl. No. 15/910,925.
U.S. Notice of Allowance dated Mar. 29, 2022 in U.S. Appl. No. 16/432,465.
U.S. Office Action dated Aug. 18, 2020 in U.S. Appl. No. 15/910,931.
U.S. Office Action dated Aug. 21, 2020 in U.S. Appl. No. 15/910,925.
U.S. Office Action dated Aug. 7, 2018 in U.S. Appl. No. 15/910,936.
U.S. Office Action dated Feb. 1, 2021 in U.S. Appl. No. 15/910,925.
U.S. Office Action dated Jul. 21, 2020 in U.S. Appl. No. 16/555,377.
U.S. Office Action dated Nov. 18, 2019 in U.S. Appl. No. 15/910,931.
U.S. Office Action dated Oct. 31, 2019 in U.S. Appl. No. 15/910,925.
U.S. Office Final Action dated Mar. 30, 2020 in U.S. Appl. No. 15/910,931.
U.S. Appl. No. 16/555,377, inventors Shrivastava et al., filed Aug. 29, 2019.

* cited by examiner

SECURITY EVENT DETECTION WITH SMART WINDOWS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The embodiments disclosed herein relate generally to detecting security events in or near a building, the building including tintable "smart windows", more particularly to smart windows that are used to detect and, in some instances, respond to, the security events.

BACKGROUND

Optically switchable windows, sometimes referred to as "smart windows," exhibit a controllable and reversible change in an optical property when appropriately stimulated by, for example, a voltage change. The optical property is typically color, transmittance, absorbance, and/or reflectance. Electrochromic devices are sometimes used in optically switchable windows. One well-known electrochromic material, for example, is tungsten oxide ($WO_3$). Tungsten oxide is a cathodic electrochromic material in which a coloration transition, transparent to blue, occurs by electrochemical reduction.

Electrically switchable windows, sometimes referred to as "smart windows", whether electrochromic or otherwise, may be used in buildings to control transmission of solar energy. Switchable windows may be manually or automatically tinted and cleared to reduce energy consumption, by heating, air conditioning and/or lighting systems, while maintaining occupant comfort.

Windows are located on the skin of a building and are common targets for potential intruders, as they are often the weakest portion of a building's skin. When protecting against theft and other unwanted forms of intrusion, windows are generally a primary concern as they are easily broken. Improved techniques for detecting and responding to such security events are desirable, particularly techniques that exploit the networked aspects of the smart windows.

SUMMARY

According to some embodiments, a method of detecting a security-related event in an optically switchable window includes: (a) measuring a current or voltage of an optically switchable device of the optically switchable window without perturbing a process of driving a transition between optical states and/or maintaining an end optical state of the optically switchable window; (b) evaluating the current or voltage measured in (a) to determine whether the current or voltage measured in (a) indicates that the optically switchable window is broken or damaged; and (c) in response to detecting the response in (b), performing a security action.

In some examples, measuring the current or voltage of the optically switchable device may be performed while the optically switchable window is undergoing the transition from a first tint state to a second tint state.

In some examples, measuring the current or voltage of the optically switchable device may include measuring an open circuit voltage of the optically switchable device. In some examples, measuring the open circuit voltage of the optically switchable device may be performed while the optically switchable window is undergoing the transition from a first tint state to a second tint state.

In some examples, evaluating the current or voltage measured in (a) may include comparing the current or voltage measured in (a) against an expected current or voltage for the process of driving the transition between optical states and/or maintaining the end optical state of the optically switchable window. In some examples, the expected current or voltage may be a previously measured current or voltage for the process of driving the transition between optical states and/or maintaining the end optical state of the optically switchable window.

In some examples, measuring the current or voltage of the optically switchable device may be performed while the optically switchable window is in the end optical state.

In some examples, measuring the current or voltage of the optically switchable device may include measuring a leakage current of the optically switchable device and evaluating the current or voltage measured in (a) may include comparing the leakage current against an expected leakage current of the optically switchable device.

According to some embodiments, a security system includes one or more interfaces for receiving sensed values for an optically switchable device of an optically switchable window; and one or more processors and memory configured to perform a method of detecting a security-related event in the optically switchable window, the method including: (a) applying a perturbation to an optically switchable device of the optically switchable window; (b) detecting a response to the perturbation that indicates that the optically switchable window is broken or damaged; and (c) in response to detecting the response in (b), performing a security action.

In some examples, the applying the perturbation may include applying a perturbing voltage or a perturbing current to the optically switchable window during a tint transition of the optically switchable window; and the perturbing voltage or the perturbing current may not be part of a tint transition drive cycle for the optically switchable window.

In some examples, the perturbation may include a voltage ramp, a current ramp, or a constant voltage to the optically switchable device, and detecting the response to the perturbation may include at least one of: detecting a current produced by the optically switchable device in response to the perturbation; or measuring an open circuit voltage of the optically switchable device after application of the perturbation. In some examples, a slope of at least one of the voltage ramp and the current ramp may be a parameter set by one or more of a window controller, a network controller, and a master controller based on one or both of a size of the window and the external temperature.

In some examples, applying the perturbation in (a) may include repeatedly applying the perturbation while the optically switchable device is in an end tint state or applying a square wave or saw tooth wave to the optically switchable device.

In some examples, the perturbation may include an oscillating current or voltage; and detecting a response to the perturbation may include detecting a frequency response produced by the optically switchable device in response to the oscillating current or voltage. In some examples, detecting the response to the perturbation may include determining that frequency absorption of the optically switchable device deviates from an expected frequency absorption.

In some examples, performing the security action may include one or more of: displaying an alert on a local or a remote device; applying a square wave or saw tooth wave to the optically switchable device; adjusting lighting in a room proximate the optically switchable window; locking a door in a room proximate the optically switchable window; adjusting a tint state of a tintable window proximate the optically switchable window; lighting a display registered with the optically switchable window; and lighting the display with a flashing light pattern on the display.

In some examples, the optically switchable device may be an electrochromic device.

In some examples, detecting the response to the perturbation may include one or both of: evaluating the absolute value of a measured current; and evaluating a change, over a period of time, in a value of the measured current. In some examples, evaluating the absolute value of the measured current may include comparing the absolute value of the measured current with a specified value.

According to some embodiments, a method of detecting a security-related event includes (a) measuring one or more of a current, a voltage and a charge count (Q) of an optically switchable window; (b) determining whether the optically switchable window is broken or damaged using one or more of the current, the voltage and the charge count measured in (a); and (c) in response to determining that the optically switchable window is broken or damaged, performing a security action and/or an alert action.

In some examples, (a) may be performed while the optically switchable window is undergoing a transition from a first tint state to a second tint state.

In some examples, the measured voltage may be an open circuit voltage of the optically switchable window.

In some examples, measuring the one or more of current, voltage and Q may be performed without visibly perturbing an apparent optical state of the optically switchable window.

In some examples, measuring the one or more of current, voltage and Q may be performed over a period of one minute or less and/or at a first regular interval.

In some examples, measuring the one or more of current, voltage and Q may be performed without perturbing a process of driving a transition of the optically switchable window between optical states.

In some examples, the method may further include always applying a non-zero hold and/or drive voltage to the optically switchable window.

In some examples, determining whether the optically switchable window is broken or damaged may include measuring the current and, when the measured current is less than a specified value, measuring one or both of the voltage and Q. In some examples, determining whether the optically switchable window is broken or damaged may include determining that the optically switchable window is not broken or damaged when at least one of the measured voltage and Q exceeds a respective threshold value. In some examples, the respective threshold values may be selectable by one or more of a window controller, a network controller, and a master controller; at least one of the window controller, the network controller, and the master controller may select the threshold value as $V_{OC\ Target}$ during some operations and select the threshold value as $1/n * V_{OC\ Target}$ during some other operations; and n is at least 2 during some other operations.

In some examples, the alert action may be selected from the group consisting of: ordering a replacement for the optically switchable window, notifying a window supplier to ship a replacement optically switchable window, notifying an optically switchable window repair technician to repair the window, notifying a manager of a building in which the optically switchable window is installed that there is an issue related to the window, notifying monitoring personnel to open a service case/record, and generating a return merchandise authorization (RMA) order; and the alert action may be performed automatically and/or without interaction of a human.

These and other features and embodiments will be described in more detail below with reference to the drawings.

DETAILED DESCRIPTION

Figure 1:
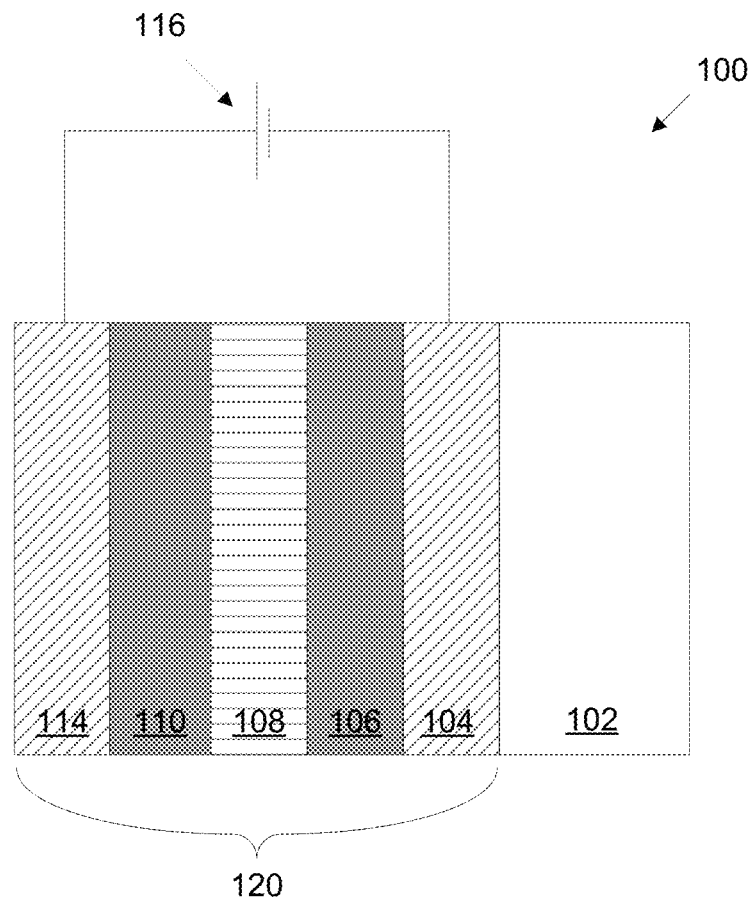
FIG. 1 shows a cross-sectional view of an electrochromic device that may be used in a tintable window.

The following detailed description is directed to certain embodiments or implementations for the purposes of describing the disclosed aspects. However, the teachings herein can be applied and implemented in a multitude of different ways. In the following detailed description, references are made to the accompanying drawings. Although the disclosed implementations are described in sufficient detail to enable one skilled in the art to practice the implementations, it is to be understood that these examples are not limiting; other implementations may be used and changes may be made to the disclosed implementations without departing from their spirit and scope. Furthermore, while the disclosed embodiments focus on electrochromic windows (also referred to as optically switchable windows, tintable and smart windows), the concepts disclosed herein may apply to other types of switchable optical devices including, for example, liquid crystal devices and suspended particle devices, among others. For example, a liquid crystal device or a suspended particle device, rather than an electrochromic device, could be incorporated into some or all of the disclosed implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C," and "A, B, and C."

Tintable Windows:

A tintable window (sometimes referred to as an optically switchable window or smart window) is a window that exhibits a controllable and reversible change in an optical property when a stimulus is applied, e.g., an applied voltage. Tintable windows can be used to control lighting conditions and the temperature within a building by regulating the transmission of solar energy (and, thus, heat load imposed on a building's interior). The control may be manual or automatic and may be used for maintaining occupant comfort while reducing the energy consumption of heating, ventilation and air conditioning (HVAC) and/or lighting systems. In some cases, tintable windows may be responsive to environmental sensors and user control. In this application, tintable windows are most frequently described with reference to electrochromic windows located between the interior and the exterior of a building or structure. However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows with MEMS devices for tinting are further described in U.S. patent application Ser. No. 14/443,353, filed May 15, 2015, and titled "MULTI-PANE WINDOWS INCLUDING ELECTROCHROMIC DEVICES AND ELECTROMECHANICAL SYSTEMS DEVICES," which is herein incorporated by reference in its entirety. In some cases, tintable windows can be located within the interior of a building, e.g., between a conference room and a hallway. In some cases, tintable windows can be used in automobiles, trains, aircraft, and other vehicles.

An Electrochromic (EC) device coating (sometimes referred to as an EC device (ECD)) is a coating having at least one layer of electrochromic material that exhibits a change from one optical state to another when an electric potential is applied across the EC device. The transition of the electrochromic layer from one optical state to another optical state can be caused by reversible ion insertion into the electrochromic material (for example, by way of intercalation) and a corresponding injection of charge-balancing electrons. In some instances, some fraction of the ions responsible for the optical transition is irreversibly bound up in the electrochromic material. In many EC devices, some or all of the irreversibly bound ions can be used to compensate for "blind charge" in the material. In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$ ($0<y\leq\sim0.3$)) causes the tungsten oxide to change from a transparent state to a blue state. EC device coatings as described herein are located within the viewable portion of the tintable window such that the tinting of the EC device coating can be used to control the optical state of the tintable window.

In some cases, a window controller paired to an EC device coating is configured to transition the EC device coating between a plurality of defined optical tint states. For example, an EC device coating may be transitioned between five optical tint states (clear or TS 0, TS 1, TS 2, TS 3 and TS 4) ranging from substantially clear (TS 0) to a fully tinted state (TS 4). In this disclosure, TS 0, TS 1, TS 2, TS 3 and TS 4 refer to the optical states of a tintable window configured with five optical tint states. In one embodiment, the five optical tint states TS 0, TS 1, TS 2, TS 3 and TS 4 have associated visual light transmittance values of approximately 82%, 58%, 40%, 7% and 1% respectively. In some cases, the tint states may be selected by a user according to their preferences. In some cases, an associated window controller may automatically make micro adjustments to the optical state of the EC device coating. For example, a controller may adjust the tinting of an EC device coating between ten or more tint states to maintain preferred interior lighting conditions.

FIG. 1 shows a schematic cross-sectional view of an electrochromic device 100 in accordance with some embodiments. The electrochromic device 100 includes a substrate 102, a first transparent conductive layer (TCL) 104, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a second TCL 114. Collectively, elements 104, 106, 108, 110, and 114 make up an electrochromic stack 120. A voltage source 116 operable to apply an electric potential across the electrochromic stack 120 effects the transition of the electrochromic coating from, e.g., a clear state to a tinted state. In other embodiments, the order of layers may be reversed with respect to the substrate. That is, the layers are in the following order: substrate, TCL, counter electrode layer, ion conducting layer, electrochromic material layer, TCL.

In various embodiments, the ion conductor region 108 may form a portion of the EC layer 106 and/or form a portion of the CE layer 110. In such embodiments, the electrochromic stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps. Electrochromic devices fabricated without depositing a distinct ion conductor material are further discussed in U.S. patent application Ser. No. 13/462,725, filed May 2, 2012, and titled "ELECTROCHROMIC DEVICES," which is herein incorporated by reference in its entirety. In some embodiments, an EC device coating may also include one or more additional layers such as one or more passive layers. For example, passive layers can be used to improve certain optical properties, to provide moisture resistance or scratch resistance. These or other passive layers also can serve to hermetically seal the EC stack 120. Additionally, various layers, including transparent conducting layers (such as 104 and 114), can be treated with anti-reflective or protective oxide or nitride layers.

In certain embodiments, the electrochromic device reversibly cycles between a clear state and a tinted state. In the clear state, a potential may be applied to the electrochromic stack 120 such that available ions in the stack that can cause the electrochromic material 106 to be in the tinted state reside primarily in the counter electrode 110. When the potential applied to the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a transition between a clear state and tinted state, the corresponding device or process encompasses other optical state transitions such as non-reflective-reflective, transparent-opaque, etc. Further, the terms "clear" and "bleached" refer generally to an optically neutral state, e.g., untinted, transparent or translucent. Still further, it should be understood that the choice of appropriate electrochromic and counter electrode materials governs the relevant optical transition and, unless specified otherwise herein, the "color" or "tint" of an electrochromic transition is not limited to any particular wavelength or range of wavelengths.

In certain embodiments, all of the materials making up electrochromic stack 120 are inorganic, solid (i.e., in the solid state), or both inorganic and solid. Because organic materials tend to degrade over time, particularly when exposed to external environmental temperature and radiation conditions such as a building window may be expected to endure, inorganic materials offer the advantage of a reliable electrochromic stack that can function for extended periods of time. Materials in the solid state also offer the advantage of not having containment and leakage issues, as materials in the liquid state often do. It should be understood that any one or more of the layers in the stack may contain some amount of organic material, but in many implementations, one or more of the layers contain little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

Figure 2:
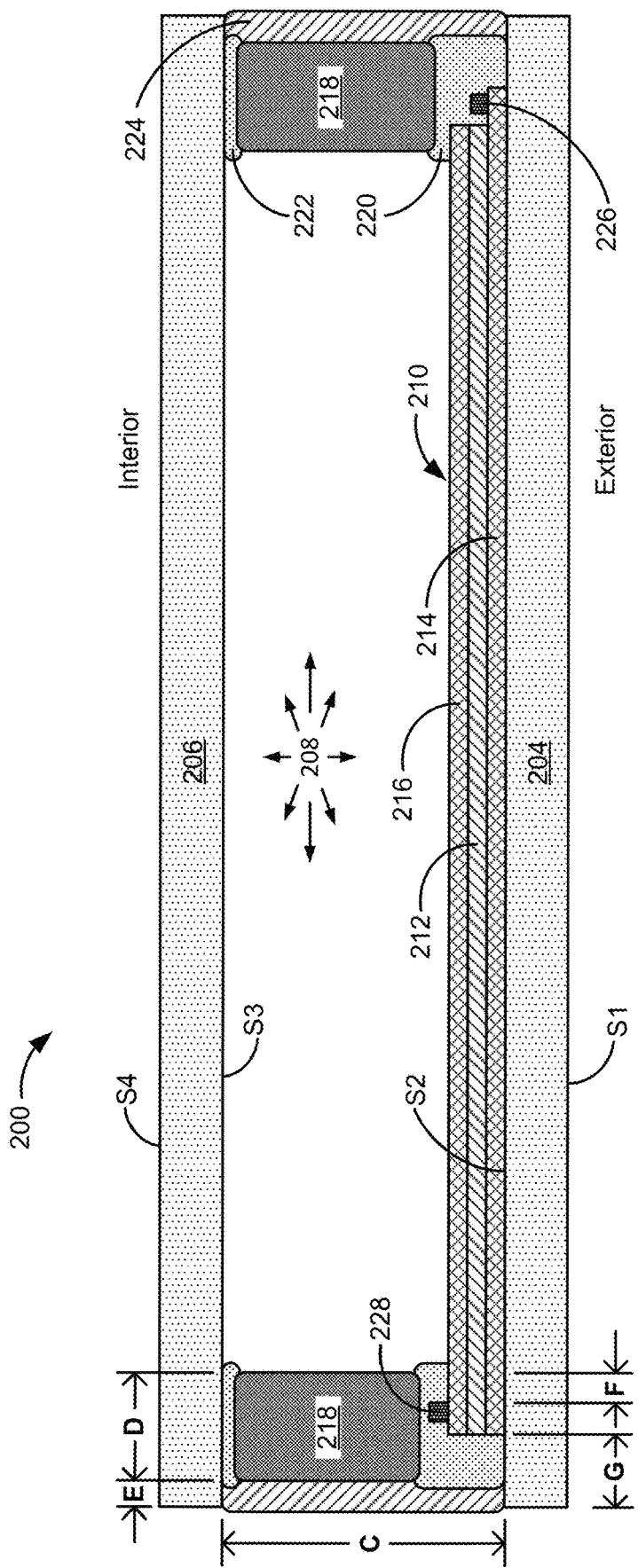
FIG. 2 shows a cross-sectional side view of an example tintable window constructed as an integrated glass unit (IGU), in accordance with some embodiments.

FIG. 2 shows a cross-sectional view of an example tintable window constructed as an insulated glass unit ("IGU") 200 in accordance with some embodiments. Generally speaking, unless stated otherwise, the terms "IGU," "tintable window," and "optically switchable window" are used interchangeably. This depicted convention is generally used, for example, because it is common and because it can be desirable to have IGUs serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in an interior volume 208 of the IGU. The inert gas fill provides at least some of the (heat) insulating function of an IGU. Electrochromic IGU's have added heat blocking capability by virtue of a tintable coating that absorbs (or reflects) heat and light.

In the illustrated example, the IGU 200 includes a first pane 204 having a first surface S1 and a second surface S2. In some implementations, the first surface S1 of the first pane 204 faces an exterior environment, such as an outdoors or outside environment. The IGU 200 also includes a second pane 206 having a first surface S3 and a second surface S4. In some implementations, the second surface S4 of the second pane 206 faces an interior environment, such as an inside environment of a home, building or vehicle, or a room or compartment within a home, building or vehicle.

In some implementations, each of the first pane 204 and the second pane 206 are transparent or translucent—at least to light in the visible spectrum. For example, each of the panes 204 and 206 may be formed of a glass material such as an architectural glass or other shatter-resistant glass material such as, for example, a silicon oxide ($SO_x$)-based glass material. As a more specific example, each of the first pane 204 and the second pane 206 may be a soda-lime glass substrate or float glass substrate. Such glass substrates can be composed of, for example, approximately 75% silica ($SiO_2$) as well as $Na_2O$, CaO, and several minor additives. However, each of the first pane 204 and the second pane 206 may be formed of any material having suitable optical, electrical, thermal, and mechanical properties. For example, other suitable substrates that can be used as one or both of the first pane 204 and the second pane 206 include other glass materials, as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first pane 204 and the second pane 206 can be strengthened, for example, by tempering, heating, or chemically strengthening.

Frequently, each of the first pane 204 and the second pane 206, as well as the IGU 200 as a whole, may be configured as a rectangular solid. However, in some implementations other shapes may be contemplated (for example, circular, elliptical, triangular, curvilinear, convex or concave shapes). In some specific rectangular implementations, a length "L" of each of the first pane 204 and the second pane 206 may be in the range of approximately 20 inches (in.) to approximately 10 feet (ft.), a width "W" of each of the first pane 204 and the second pane 206 may be in the range of approximately 20 in. to approximately 10 ft., and a thickness "T" of each of the first pane 204 and the second pane 206 can be in the range of approximately 0.3 millimeters (mm) to approximately 10 mm (although other lengths, widths or thicknesses, both smaller and larger, are possible and may be desirable based on the needs of a particular user, manager, administrator, builder, architect or owner). In examples where thickness T of substrate 204 is less than 3 mm, typically the substrate is laminated to an additional substrate which is thicker and thus protects the thin substrate 204. Additionally, while the IGU 200 includes two panes (204 and 206), in some other implementations, an IGU may include three or more panes. Furthermore, in some implementations, one or more of the panes can itself be a laminate structure of two, three, or more layers or sub-panes.

In the illustrated example, the first pane 204 and the second pane 206 are spaced apart from one another by a spacer 218, which is typically a frame structure, to form the interior volume 208. In some implementations, the interior volume 208 is filled with Argon (Ar), although in some other implementations, the interior volume 208 can be filled with another gas, such as another noble gas (for example, krypton (Kr) or xenon (Xe)), another (non-noble) gas, or a mixture of gases (for example, air). Filling the interior volume 208 with a gas such as Ar, Kr, or Xe can reduce conductive heat transfer through the IGU 200 because of the low thermal conductivity of these gases as well as improve acoustic insulation due to their high atomic weights. In some other implementations, the interior volume 208 can be evacuated of air or other gas. Spacer 218 generally determines the height "C" of the interior volume 208; that is, the spacing between the first and the second panes 204 and 206. In FIG. 2, the thickness of the ECD 210, sealant 220/222 and bus bars 226/228 is not to scale; these components are generally very thin but are exaggerated here for ease of illustration only. In some implementations, the spacing "C" between the first and the second panes 204 and 206 is in the range of approximately 6 mm to approximately 30 mm. The width "D" of spacer 218 can be in the range of approximately 5 mm to approximately 25 mm (although other widths are possible and may be desirable).

Although not shown in the cross-sectional view of FIG. 2, the spacer 218 may generally be configured as a frame structure formed around all sides of the IGU 200 (for example, top, bottom, left and right sides of the IGU 200). The spacer 218 can be formed of a foam or plastic material, in some implementations. However, in some other implementations, the spacer 218 can be formed of metal or other conductive material, for example, a metal tube or channel structure having a first side configured for sealing to the substrate 204, a second side configured for sealing to the substrate 206, and a third side configured to support and separate the lites and as a surface on which to apply a sealant 224. A first primary seal 220 adheres and hermetically seals spacer 218 and the second surface S2 of the first pane or substrate 204. A second primary seal 222 adheres and hermetically seals spacer 218 and the first surface S3 of the second pane or substrate 206. In some implementations, each of the primary seals 220 and 222 can be formed of an adhesive sealant such as, for example, polyisobutylene (PIB). In some implementations, IGU 200 further includes the secondary seal 224 that hermetically seals a border around the entire IGU 200 outside of spacer 218. To this end, the spacer 218 can be inset from the edges of the first and the second panes 204 and 206 by a distance "E." The distance "E" can be in the range of approximately 4 mm to approximately 8 mm (although other distances are possible and may be desirable). In some implementations, secondary seal 224 can be formed of an adhesive sealant such as, for example, a polymeric material that resists water and that adds structural support to the assembly, such as silicone, polyurethane and similar structural sealants that form a watertight seal.

In the implementation shown in FIG. 2, an ECD 210 is formed on the second surface S2 of the first pane 204. In some other implementations, ECD 210 can be formed on another suitable surface, for example, the first surface S1 of the first pane 204, the first surface S3 of the second pane 206 or the second surface S4 of the second pane 206. The ECD 210 includes an electrochromic ("EC") stack, which itself may include one or more layers as described with reference to FIG. 1. In the illustrated example, the EC stack includes layers 212, 214 and 216.

Window Controllers:

Window controllers are associated with one or more tintable windows and are configured to control a window's optical state by applying a stimulus to the windo—e.g., by applying a voltage or a current to an EC device coating. Window controllers as described herein may have many sizes, formats, and locations with respect to the optically switchable windows they control. Typically, the controller directly responsible for causing a tint transition will be attached to a lite of an IGU or laminate, but it can also be in a frame that houses the IGU or laminate or even in a separate location. As previously mentioned, a tintable window may include one, two, three or more individual electrochromic panes (an electrochromic device on a transparent substrate). Also, an individual pane of an electrochromic window may have an electrochromic coating that has independently tintable zones. A controller as described herein can control all electrochromic coatings associated with such windows, whether the electrochromic coating is monolithic or zoned.

If not directly attached to a tintable window, IGU, or frame, the window controller is generally located in proximity to the tintable window. For example, a window controller may be adjacent to the window, on the surface of one of the window's lites, within a wall next to a window, or within a frame of a self-contained window assembly. In some embodiments, the window controller is an "in situ" controller; that is, the controller is part of a window assembly, an IGU or a laminate, and may not have to be matched with the electrochromic window, and installed, in the field, e.g., the controller travels with the window as part of the assembly from the factory. The controller may be installed in the window frame of a window assembly, or be part of an IGU or laminate assembly, for example, mounted on or between panes of the IGU or on a pane of a laminate. In cases where a controller is located on the visible portion of an IGU, at least a portion of the controller may be substantially transparent. Further examples of "on-glass" controllers are provided in U.S. patent application Ser. No. 14/951,410, filed Nov. 14, 2015, and titled "SELF CONTAINED EC IGU," which is herein incorporated by reference in its entirety. In some embodiments, a localized controller may be provided as more than one part, with at least one part (e.g., including a memory component storing information about the associated electrochromic window) being provided as a part of the window assembly and at least one other part being separate and configured to mate with the at least one part that is part of the window assembly, IGU or laminate. In certain embodiments, a controller may be an assembly of interconnected parts that are not in a single housing, but rather spaced apart, e.g., in the secondary seal of an IGU. In other embodiments the controller is a compact unit, e.g., in a single housing or in two or more components that combine, e.g., a dock and housing assembly, that is proximate the glass, not in the viewable area, or mounted on the glass in the viewable area.

In one embodiment, the window controller is incorporated into or onto the IGU and/or the window frame prior to installation of the tintable window, or at least in the same building as the window. In one embodiment, the controller is incorporated into or onto the IGU and/or the window frame prior to leaving the manufacturing facility. In one embodiment, the controller is incorporated into the IGU, substantially within the secondary seal. In another embodiment, the controller is incorporated into or onto the IGU, partially, substantially, or wholly within a perimeter defined by the primary seal between the sealing separator and the substrate.

Having the controller as part of an IGU and/or a window assembly, the IGU can possess logic and features of the controller that, e.g., travels with the IGU or window unit. For example, when a controller is part of the IGU assembly, in the event the characteristics of the electrochromic device (s) change over time (e.g., through degradation), a characterization function can be used, for example, to update control parameters used to drive tint state transitions. In another example, if already installed in an electrochromic window unit, the logic and features of the controller can be used to calibrate the control parameters to match the intended installation, and if already installed, the control parameters can be recalibrated to match the performance characteristics of the electrochromic pane(s).

In other embodiments, a controller is not pre-associated with a window, but rather a dock component, e.g., having parts generic to any electrochromic window, is associated with each window at the factory. After window installation, or otherwise in the field, a second component of the controller is combined with the dock component to complete the electrochromic window controller assembly. The dock component may include a chip which is programmed at the factory with the physical characteristics and parameters of the particular window to which the dock is attached (e.g., on the surface which will face the building's interior after installation, sometimes referred to as surface 4 or "S4"). The second component (sometimes called a "carrier," "casing," "housing," or "controller") is mated with the dock, and when powered, the second component can read the chip and configure itself to power the window according to the particular characteristics and parameters stored on the chip. In this way, the shipped window need only have its associated parameters stored on a chip, which is integral with the window, while the more sophisticated circuitry and components can be combined later (e.g., shipped separately and installed by the window manufacturer after the glazier has installed the windows, followed by commissioning by the window manufacturer). Various embodiments will be described in more detail below. In some embodiments, the chip is included in a wire or wire connector attached to the window controller. Such wires with connectors are sometimes referred to as pigtails.

As indicated hereinabove, an IGU includes two (or more) substantially transparent substrates, for example, two panes of glass, where at least one substrate includes an electrochromic device disposed thereon, and the panes have a separator (spacer) disposed between them. An IGU is typically hermetically sealed, having an interior region that is isolated from the ambient environment. A "window assembly" may include an IGU or for example a stand-alone laminate, and includes electrical leads for connecting the IGUs, laminates, and/or one or more electrochromic devices to a voltage source, switches and the like, and may include a frame that supports the IGU or laminate. A window assembly may include a window controller as described herein, and/or components of a window controller (e.g., a dock).

As used herein, the term outboard means closer to the outside environment, while the term inboard means closer to the interior of a building. For example, in the case of an IGU having two panes, the pane located closer to the outside environment is referred to as the outboard pane or outer pane, while the pane located closer to the inside of the building is referred to as the inboard pane or inner pane. As labeled in FIG. 2, the different surfaces of the IGU may be referred to as S1, S2, S3, and S4 (assuming a two-pane IGU). S1 refers to the exterior-facing surface of the outboard lite (i.e., the surface that can be physically touched by someone standing outside). S2 refers to the interior-facing surface of the outboard lite. S3 refers to the exterior-facing surface of the inboard lite. S4 refers to the interior-facing surface of the inboard lite (i.e., the surface that can be physically touched by someone standing inside the building). In other words, the surfaces are labeled S1-S4, starting from the outermost surface of the IGU and counting inwards. In cases where an IGU includes three panes, this same convention is used (i.e., with S6 being the surface that can be physically touched by someone standing inside the building). In certain embodiments employing two panes, the electrochromic device (or other optically switchable device) may be disposed on S3.

Further examples of window controllers and their features are presented in U.S. patent application Ser. No. 13/449,248, filed Apr. 17, 2012, and titled "CONTROLLER FOR OPTICALLY-SWITCHABLE WINDOWS"; U.S. patent application Ser. No. 13/449,251, filed Apr. 17, 2012, and titled "CONTROLLER FOR OPTICALLY-SWITCHABLE WINDOWS"; U.S. patent application Ser. No. 15/334,835, filed Oct. 26, 2016, and titled "CONTROLLERS FOR OPTICALLY-SWITCHABLE DEVICES"; and International Patent Application No. PCT/US17/20805, filed Mar. 3, 2017, and titled "METHOD OF COMMISSIONING ELECTROCHROMIC WINDOWS," each of which is herein incorporated by reference in its entirety.

Control Algorithms for Electrochromic Windows

Window controllers are configured to control the optical state of windows by applying a voltage or a current to an EC device coating. General non-limiting examples of control algorithms are now provided for controlling the optical state of an EC device coating.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example, the starting optical state may be 80% transmissivity and the ending optical state may be 50% transmissivity. The optical transition is typically driven by applying an appropriate electric potential across the two thin conductive sheets of the optically switchable device.

A "starting optical state" is the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity. Alternatively, the starting optical state may be an intermediate optical state having a value somewhere between the maximum and minimum optical states for the optically switchable device; e.g., 50% transmissivity.

An "ending optical state" is the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. Alternatively, the ending optical state may be an intermediate optical state having a value somewhere between the maximum and minimum optical states for the optically switchable device; e.g., 50% transmissivity.

"Bus bar" refers to an electrically conductive strip attached to a conductive layer such as a transparent conductive electrode spanning the area of an optically switchable device. The bus bar delivers electrical potential and current from an external lead to the conductive layer. An optically switchable device may include two or more bus bars, each connected to a single conductive layer of the device. In various embodiments, a bus bar forms a long thin line that spans most of the length of the length or width of a device. Often, a bus bar is located near the edge of the device.

"Applied Voltage" or $V_{app}$ refers to the difference in potential applied to two bus bars of opposite polarity on the electrochromic device. Each bus bar is electronically connected to a separate transparent conductive layer. The applied voltage may include different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" or $V_{eff}$ refers to the potential between the positive and negative transparent conducting layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state. In some cases, without application of a hold voltage, electrochromic windows return to their natural tint state. In other words, maintenance of a desired tint state may require application of a hold voltage.

"Drive Voltage" refers to the applied voltage provided during at least a portion of an optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage.

"Open circuit voltage" ($V_{OC}$) refers to the voltage across the EC device (or across the terminals or bus bars applying connected to the EC device) when little or no current passes. In certain embodiments, the $V_{OC}$ is measured after a defined period of time has passed since applying conditions of interest (e.g., an AC signal or pulse). For example, an open circuit voltage may be taken a few milliseconds after applying the conditions or, in some cases, may be taken on or about 1 to several seconds after applying the conditions of interest.

Figure 3:
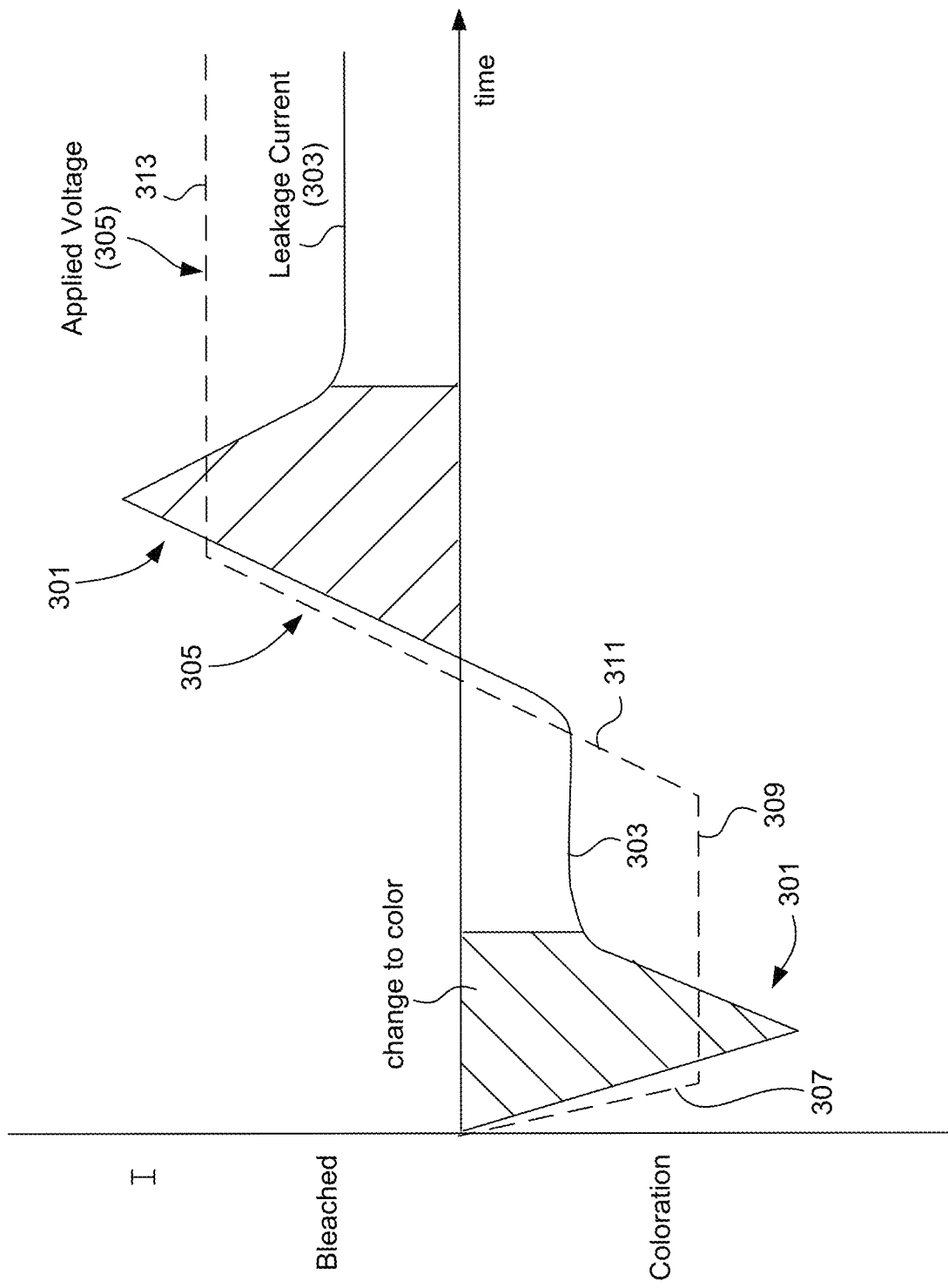
FIG. 3 is a graph illustrating voltage and current profiles associated with driving an electrochromic device from a clear state to a tinted state and from a tinted state to a clear state.
Figure 4:
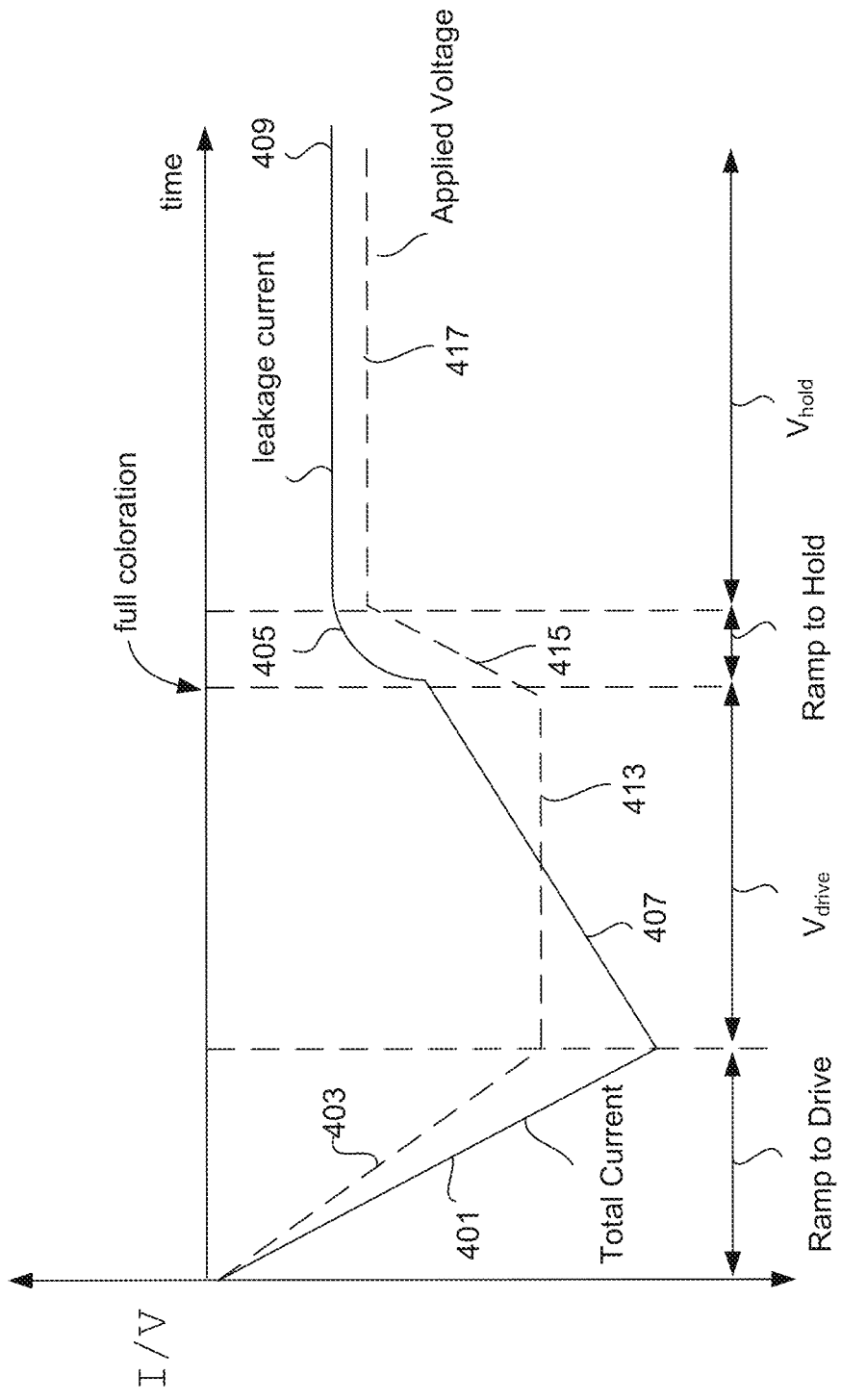
FIG. 4 is a graph illustrating an implementation of a voltage and current profile associated with driving an electrochromic device from a clear state to a tinted state.

To increase the speed of an optical transition, the applied voltage may initially be provided at a magnitude greater than that required to hold the device at a particular optical state in equilibrium. This approach is illustrated in FIGS. 3 and 4. FIG. 3 is a graph depicting voltage and current profiles associated with driving an electrochromic device from a clear state to a tinted state and from a tinted state to a clear state. FIG. 4 is a graph depicting certain voltage and current profiles associated with driving an electrochromic device from a tinted state to a clear state. Further, as used herein, the terms clear and bleached are used interchangeably when referring to the optical state of the electrochromic device of an IGU, as are the terms tinted and colored. In certain embodiments, the drive and/or the hold voltage includes a non-zero value that is sufficient to maintain a non-zero open circuit voltage. In one embodiment, the non-zero drive and/or hold voltage is always maintained at a non-zero value such that drops in open-circuit voltage can always be detected. In one embodiment, the drive and/or hold voltage is never allowed to drop below a range that is between about 100 and 500 millivolts.

FIG. 3 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes. Many different types of electrochromic device may have a current profile similar to that illustrated by FIG. 3. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 301 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 303) represent electronic leakage current while the device is in the new optical state.

In the figure, voltage profile 305 is superimposed on the current curve. The voltage profile follows the sequence: negative ramp 307, negative hold 309, positive ramp 311, and positive hold 313. Note that the voltage remains constant after reaching its maximum magnitude and during the length of time that the device remains in its defined optical state. Voltage ramp 307 drives the device to a new colored state and voltage hold 309 maintains the device in the colored state until voltage ramp 311 in the opposite direction drives the transition from the colored state to a bleached state. In some implementations, voltage holds 309 and 313 may also be referred to as $V_{drive}$. In some switching algorithms, a current cap is imposed. That is, the current is not permitted to exceed a defined level in order to prevent damaging the device (e.g., driving ion movement through the material layers too quickly can physically damage the material layers). The coloration speed is a function of not only the applied voltage but also the temperature and the voltage ramping rate.

FIG. 4 illustrates a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 4.

The voltage values depicted in FIG. 4 represent the applied voltage ($V_{app}$) values. The applied voltage profile is shown by the dashed line. For contrast, the current density in the device is shown by the solid line. In the depicted profile, $V_{app}$ includes four components: a ramp to drive component 403, which initiates the transition, a $V_{drive}$ component 413, which continues to drive the transition, a ramp to hold component 415, and a $V_{hold}$ component 417. The ramp components are implemented as variations in $V_{app}$ and the $V_{drive}$ and $V_{hold}$ components provide constant or substantially constant $V_{app}$ magnitudes.

The ramp to drive component 403 is characterized by a ramp rate (increasing magnitude) and a magnitude of $V_{drive}$. When the magnitude of the applied voltage reaches $V_{drive}$, the ramp to drive component 403 is completed. The $V_{drive}$ component 413 is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component 415 is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component 417 is characterized by the magnitude of $V_{hold}$ and the duration of $V_{hold}$. The duration of $V_{hold}$ is typically governed by the length of time that the device is held in the colored state (or conversely in the bleached state). Unlike the ramp to drive, $V_{drive}$, and ramp to hold components (403, 413, 415), the $V_{hold}$ component 417 may have an arbitrary length, which may be independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, titled "CONTROLLER FOR OPTICALLY-SWITCHABLE WINDOWS," filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile are set for a particular electrochromic device (having its own bus bar separation, resistivity, etc.) and vary based on current conditions. In other words, in such embodiments, the voltage profile does not take into account feedback such as temperature, current density, and the like.

As indicated, all voltage values shown in the voltage transition profile of FIG. 4 correspond to the $V_{app}$ values described above. They do not correspond to the $V_{eff}$ values described above. In other words, the voltage values depicted in FIG. 4 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 4, the current in the device follows the profile of the ramp to drive voltage component until the ramp to drive portion of the profile ends and the $V_{drive}$ portion begins. See current component 401 in FIG. 4. Safe levels of current and voltage can be determined empirically or based on other feedback. U.S. Pat. No. 8,254,013, titled "CONTROLLING TRANSITIONS IN OPTICALLY SWITCHABLE DEVICES," filed Mar. 16, 2011, is incorporated herein by reference and presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 407.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting material. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 4, the device current transitions in a segment 405 during the ramp to hold component. The current settles to a stable leakage current 409 during $V_{hold}$.

Certain embodiments make use of electrical probing and monitoring to determine when an optical transition between a first optical state and a second optical state of an optically switchable device has proceeded to a sufficient extent that the application of a drive voltage can be terminated. In certain embodiments, electrical probing allows for a shorter application of drive voltages, at least on average, than possible without probing. Further, such probing can help ensure that an optical transition progresses to the desired state. Embodiments using such probing or monitoring may be leveraged to determine whether a security-relevant event has occurred. Before explaining how this is done, an example process for probing optical transitions will be presented.

In certain embodiments, the probing technique involves pulsing the current or voltage applied to drive the transition and then monitoring the current or voltage response to detect an "overdrive" condition in the vicinity of the bus bars. An overdrive condition occurs when the effective local voltage is greater than needed to cause a local optical transition. For example, if an optical transition to a clear state is deemed complete when $V_{eff}$ reaches 2V, and the local value of $V_{eff}$ near a bus bar is 2.2V, the position near the bus bar may be characterized as in an overdrive condition.

One example of a probing technique involves pulsing the applied drive voltage by dropping it to the level of the hold voltage (or the hold voltage modified by an appropriate offset) and monitoring the current response to determine the direction of the current response. In this example, when the current response reaches a defined threshold, the device control system determines that it is now time to transition from the drive voltage to the hold voltage. Many possible variations to the probing protocol exist. Such variations may include certain pulse protocols defined in terms of the length of time from the initiation of the transition to the first pulse, the duration of the pulses, the size of the pulses, and the frequency of the pulses.

In some cases, the probing technique can be implemented using a drop in applied current (e.g., measuring the open circuit voltage). The current or voltage response indicates how close to completion the optical transition has come. In some cases, the response is compared to a threshold current or voltage for a particular time (e.g., the time that has elapsed since the optical transition was initiated). In some embodiments, the comparison is made for a progression of the current or voltage responses using sequential pulses or checks. The steepness of the progression may indicate when the end state is likely to be reached. A linear extension to this threshold current may be used to predict when the transition will be complete, or more precisely when it will be sufficiently complete that it is appropriate to drop the drive voltage to the hold voltage.

With regard to algorithms for ensuring that the optical transition from first state to the second state occurs within a defined timeframe, the controller may be configured or designed to increase the drive voltage as appropriate to speed up the transition when the interpretation of the pulse responses suggests that the transition is not progressing fast enough to meet the desired speed of transition. In certain embodiments, when it is determined that the transition is not progressing sufficiently fast, the transition switches to a mode where it is driven by an applied current. The current is sufficiently great to increase the speed of the transition but is not so great that it degrades or damages the electrochromic device. In some implementations, the maximum suitably safe current may be referred to as $I_{safe}$. Examples of $I_{safe}$ may range between about 5 and 250 $\mu A/cm^2$. In current controlled drive mode, the applied voltage is allowed to float during the optical transition. Then, during this current controlled drive step, could the controller periodically probes by, e.g., dropping to the hold voltage and checking for completeness of transition in the same way as when using a constant drive voltage.

In general, the probing technique may determine whether the optical transition is progressing as expected. If the technique determines that the optical transition is proceeding too slowly, it can take steps to speed the transition. For example, it can increase the drive voltage. Similarly, the technique may determine that the optical transition is proceeding too quickly and risks damaging the device. When such determination is made, the probing technique may take steps to slow the transition. As an example, the controller may reduce the drive voltage.

In some cases, probing techniques are used for on-the-fly modification of the optical transition to a different end state. In some cases, it will be necessary to change the end state after a transition begins. Examples of reasons for such modification include (1) a user's manual overriding a previously specified end tint state and (2) a widespread electrical power shortage or disruption. In such situations, the initially set end state might be transmissivity=40% and the modified end state might be transmissivity=5%.

Where an end state modification occurs during an optical transition, the probing techniques disclosed herein can adapt and move directly to the new end state, rather than first completing the transition to the initial end state.

It should be understood that the probing techniques presented herein need not be limited to measuring the magnitude of the device's current in response to a voltage drop (pulse). There are various alternatives to measuring the magnitude of the current response to a voltage pulse as an indicator of how far as the optical transition has progressed. In one example, the profile of a current transient provides useful information. In another example, measuring the open circuit voltage of the device provides the requisite information. In such embodiments, the pulse involves simply applying no voltage to device and then measuring the voltage that the open circuit device applies. Further, it should be understood that current and voltage based algorithms are equivalent. In a current based algorithm, the probe is implemented by dropping the applied current and monitoring the device response. The response may be a measured change in voltage. For example, the device may be held in an open circuit condition to measure the voltage between bus bars.

Figure 5:
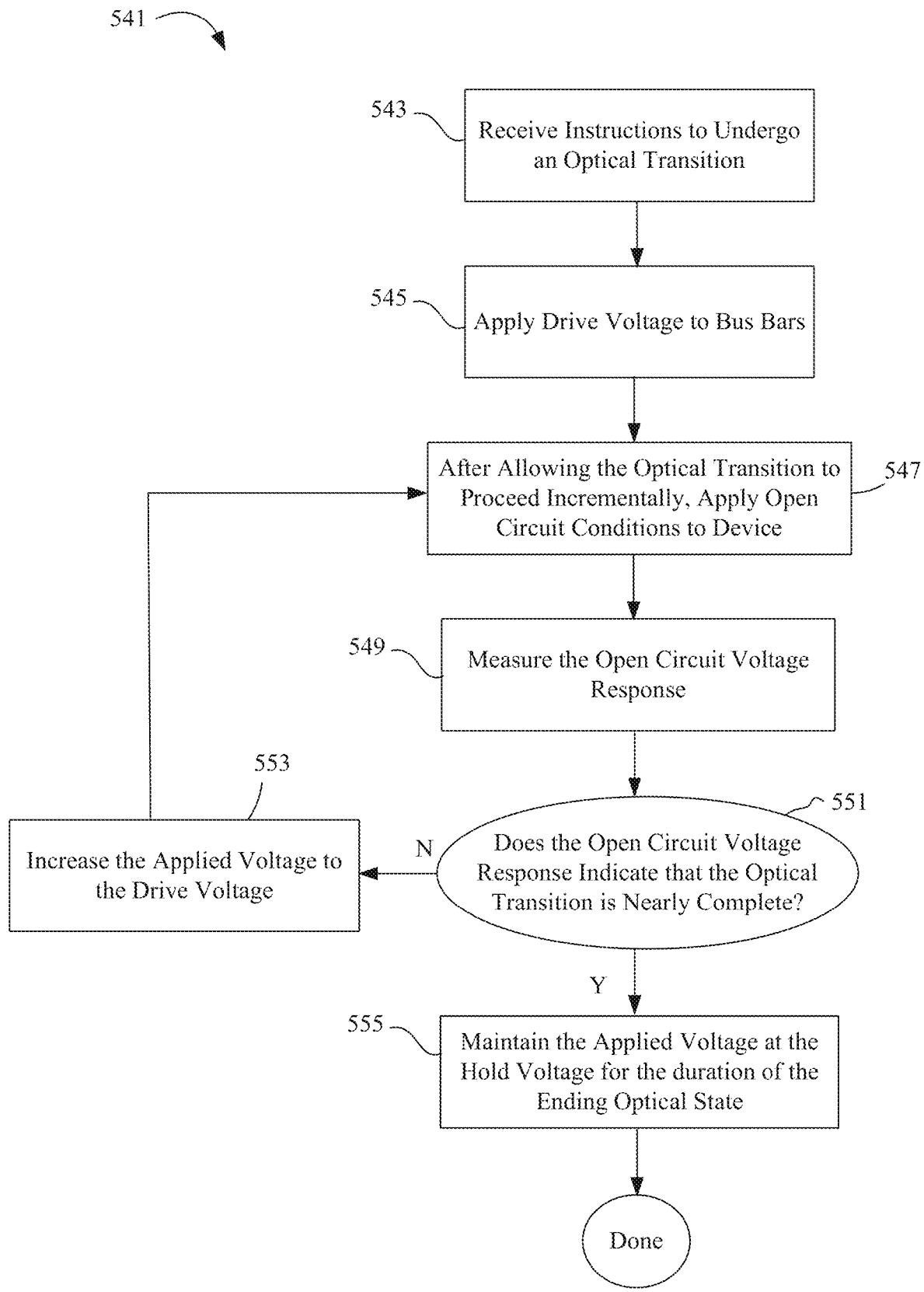
FIG. 5 is a flowchart depicting a process for probing the progress of an optical transitioning and determining when the transition is complete.

FIG. 5 presents a flowchart 541 for a process of monitoring and controlling an optical transition in accordance with certain disclosed embodiments. In this case, the process condition probed is the open circuit voltage, as described in the previous paragraph. As depicted, the process begins with an operation denoted by reference number 543, where a controller or other control logic receives instructions to direct the optical transition. As explained, the optical transition may be an optical transition between a tinted state and a more clear state of the electrochromic device. The instructions for directing the optical transition may be provided to the controller based upon a preprogrammed schedule, an algorithm reacting to external conditions, manual input from a user, etc. Regardless of how the instructions originate, the controller may act on them, at the operation denoted by reference number 545, by applying a drive voltage to the bus bars of the optically switchable device. After allowing the optical transition to proceed incrementally, the controller applies open circuit conditions to the electrochromic device at operation 547. Next, the controller measures the open circuit voltage response at operation 549.

In certain implementations, the open circuit voltage is measured/recorded after a timeframe that is dependent upon the behavior of the open circuit voltage. In other words, the open circuit voltage may be measured over time after open circuit conditions are applied, and the voltage chosen for analysis may be selected based on the voltage vs. time behavior. As described above, after application of open circuit conditions, the voltage goes through an initial drop, followed by a first relaxation, a first plateau, and a second relaxation. Each of these periods may be identified on a voltage vs. time plot based on the slope of curve. For example, the first plateau region will relate to a portion of the plot where the magnitude of $dV_{OC}/dt$ is relatively low. This may correspond to conditions in which the ionic current has stopped (or nearly stopped) decaying. As such, in certain embodiments, the open circuit voltage used in the feedback/analysis is the voltage measured at a time when the magnitude of $dV_{OC}/dt$ drops below a certain threshold.

Referring still to FIG. 5, after the open circuit voltage response is measured, it can be compared to a target open circuit voltage at operation 551. The target open circuit voltage may correspond to the hold voltage. In certain cases, the target open circuit voltage corresponds to the hold voltage as modified by an offset. Where the open circuit voltage response indicates that the optical transition is not yet nearly complete (i.e., where the open circuit voltage has not yet reached the target open circuit voltage), the method continues at operation 553, where the applied voltage is increased to the drive voltage for an additional period of time. After the additional period of time has elapsed, the method can repeat from operation 547, where the open circuit conditions are again applied to the device. At some point in the method 541, it will be determined in operation 551 that the open circuit voltage response indicates that the optical transition is nearly complete (i.e., where the open circuit voltage response has reached the target open circuit voltage). When this is the case, the method continues at operation 555, where the applied voltage is maintained at the hold voltage for the duration of the ending optical state. Probing methods are described in greater detail in U.S. Pat. No. 9,885,935, issued Feb. 6, 2018, and titled "CONTROLLING TRANSITIONS IN OPTICALLY SWITCHABLE DEVICES," which is herein incorporated by reference in its entirety.

Window Control System:

When a building is outfitted with tintable windows, window controllers may be connected to one another and/or other entities via a communications network sometimes referred to as a window control network or a window network. The network and the various devices (e.g., controllers and sensors) that are connected via the network (e.g., wired or wireless power transfer and/or communication) are referred to herein as a window control system. Window control networks may provide tint instructions to window controllers, provide window information to master controllers or other network entities, and the like. Examples of window information include current tint state or other information collected by the window controller. In some cases, a window controller has one or more associated sensors including, for example, a photosensor, a temperature sensor, an occupancy sensor, and/or gas sensors that provide sensed information over the network. In some cases, information transmitted over a window communication network need not impact window control. For example, information received at a first window configured to receive a WiFi or LiFi signal may be transmitted over the communication network to a second window configured to wirelessly broadcast the information as, e.g., a WiFi or LiFi signal. A window control network need not be limited to providing information for controlling tintable windows, but may also be able to communicate information for other devices interfacing with the communications network such as HVAC systems, lighting systems, security systems, personal computing devices, and the like.

Figure 6:
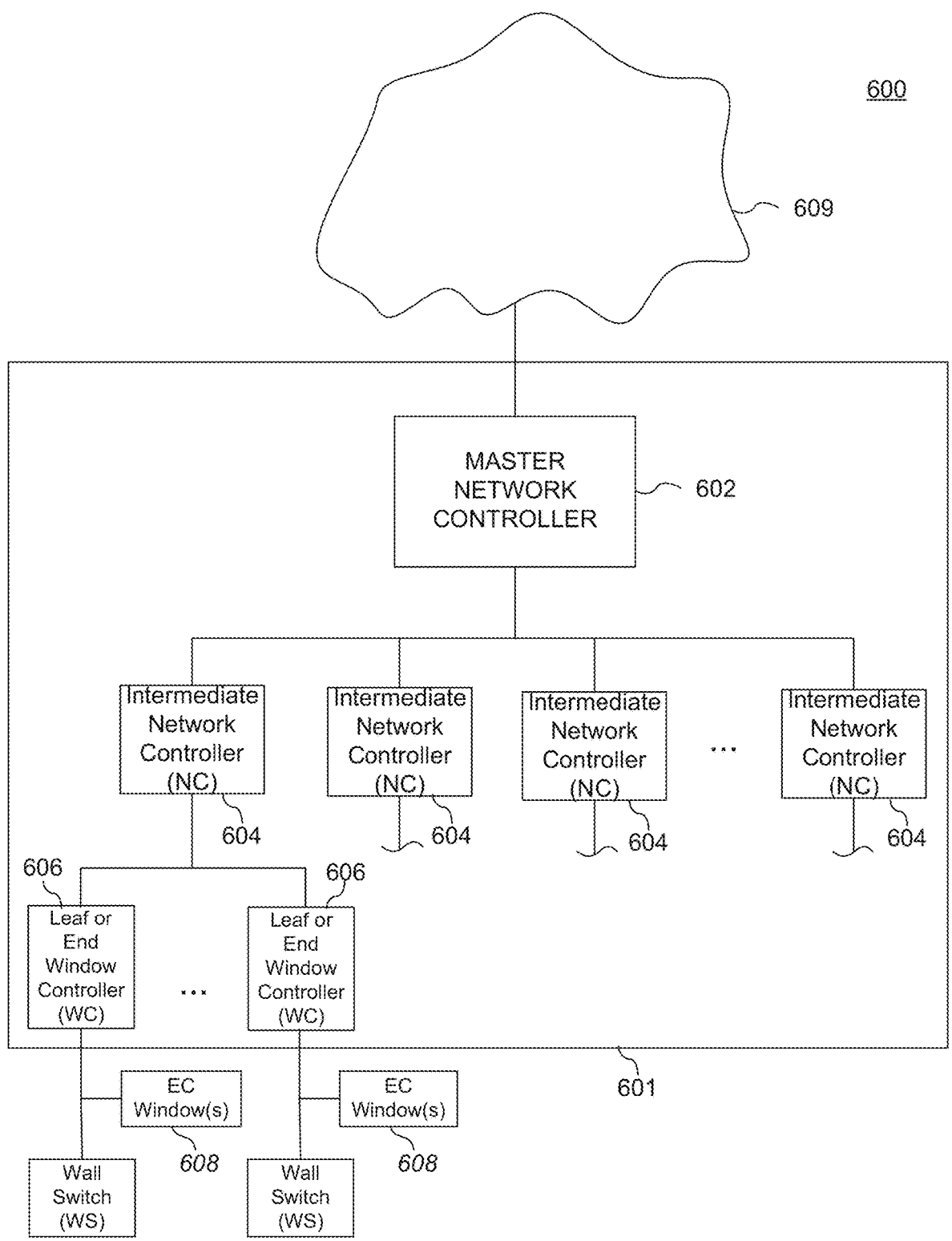
FIG. 6 depicts a window control network provided by of a window control system having one or more tintable windows.

FIG. 6 provides an example of a control network 601 of a window control system 600. The network may distribute both control instructions and feedback, as well as serving as a power distribution network. A master network controller 602 communicates and functions in conjunction with multiple intermediate network controllers (NC's) 604, each of which NC 604 is capable of addressing a plurality of window controllers (WC's) 606 (sometimes referred to herein as leaf controllers) that apply a voltage or current to control the tint state of one or more optically switchable windows 608. Communications between NC's 604, WC's 606, and windows 608 may occur via wired (e.g., Ethernet) or via a wireless (e.g., WiFi or LiFi) connection. In some implementations, the master network controller 602 issues the high-level instructions (such as the final tint states of the electrochromic windows) to the NC's 604, and the NC's 604 then communicate the instructions to the corresponding WC's 608. Typically, a master network controller 602 may be configured to communicate with one or more outward face networks 609. Control network 601 can include any suitable number of distributed controllers having various capabilities or functions and need not be arranged in the hierarchical structure depicted in FIG. 6. As discussed elsewhere herein, control network 601 may also be used as a communication network between distributed controllers (e.g., 602, 604, 606) that act as communication nodes to other devices or systems (e.g., 609).

In some embodiments, outward facing network 609 is part of or connected to a building management system (BMS). A BMS is a computer-based control system that can be installed in a building to monitor and control the building's mechanical and electrical equipment. A BMS may be configured to control the operation of HVAC systems, lighting systems, power systems, elevators, fire systems, security systems, and other safety systems. BMSs are frequently used in large buildings where they function to control the environment within the building. For example, a BMS may monitor and control the lighting, temperature, carbon dioxide levels, and humidity within the building. In doing so, a BMS may control the operation of furnaces, air conditioners, blowers, vents, gas lines, water lines, and the like. To control a building's environment, the BMS may turn on and off these various devices according to rules established by, for example, a building administrator. One function of a BMS is to maintain a comfortable environment for the occupants of a building. In some implementations, a BMS can be configured not only to monitor and control building conditions, but also to optimize the synergy between various systems—for example, to conserve energy and lower building operation costs. In some implementations, a BMS can be configured with a disaster response. For example, a BMS may initiate the use of backup generators and turn off water lines and gas lines. In some cases, a BMS has a more focused application—e.g., simply controlling the HVAC system—while parallel systems such as lighting, tintable window, and/or security systems stand alone or interact with the BMS.

In some embodiments, a control network 601 may itself provide services to a building that are typically provided by a BMS. Some or all of controllers 602, 604, and 606 may, in some cases, offer computational resources that can be used for other building systems. For example, controllers on the window control network may individually or collectively run software for one or more BMS applications as described previously. In some cases, window control network 601 can provide communication and/or power to other building systems. Examples of how a window control network can provide services for monitoring and/or controlling other systems in a building are further described in International Patent application No. PCT/US18/29460, filed May 25, 2018, and titled "TINTABLE WINDOW SYSTEM FOR BUILDING SERVICES," which is herein incorporated by reference in its entirety.

In some embodiments, network 609 is a remote network. For example, network 609 may operate in the cloud or on a device remote from the building having the optically switchable windows. In some embodiments, network 609 is a network that provides information or allows control of optically switchable windows via a remote wireless device. In some cases, network 609 includes seismic event detection logic. Further examples of window control systems and their features are presented in U.S. patent application Ser. No.

15/334,832, filed Oct. 26, 2016, and titled "CONTROLLERS FOR OPTICALLY-SWITCHABLE DEVICES" and International Patent Application No. PCT/US17/62634, filed on Nov. 20, 2017, and titled "AUTOMATED COMMISSIONING OF CONTROLLERS IN A WINDOW NETWORK," both of which are herein incorporated by reference in its entirety.

Automatic Location Determination and Awareness of Users:

In some embodiments, a window control system enables services for locating and/or tracking devices or users carrying such devices. Windows, window controllers, and other devices on the window control network can be configured with antennas configured to communicate via various forms of wireless electromagnetic signals. Common wireless protocols used for electromagnetic communication include, but are not limited to, Bluetooth, BLE, Wi-Fi, RF, and ultra-wideband (UWB). The relative location between two or more devices can be determined from information relating to received transmissions at one or more antennas. Information that can be used to determine location includes, e.g., the received signal strength, the time of arrival, the signal frequency, and the angle of arrival. When determining a device's location from these metrics, a triangulation algorithm may be implemented that in some instances accounts for the physical layout of a building. Ultimately, an accurate location of individual window network components can be obtained using such technologies. For example, the location of a window controller having a UWB micro-location chip can be easily determined to within 10 centimeters of its actual location. Geolocation methods involving window antennas are further described in PCT Patent Application No's. PCT/US17/62634 and PCT/US17/31106, each of which have been incorporated herein by reference in its entirety. As used herein, geo-positioning and geolocation may refer to any method in which the position or relative position of a window or device is determined in part by analysis of electromagnetic signals.

In some cases, window antennas can be used to provide location services to a user based on a determined position an associated electronic device. For example, a field systems engineer may be provided with information needed for nearby tintable windows. In some cases, geopositioning can be used for security applications. For instance, doors may be locked when an unauthorized device is located within the building and doors can be unlocked for security personnel. In some cases, an unrecognized device (e.g., a cell phone) can be tracked via monitoring the signals emitted by the device. For example, an electronic device might emit cellular communication signals or might send signals in an attempt to join or request information about a local wireless network.

Transparent Displays

Figure 7:
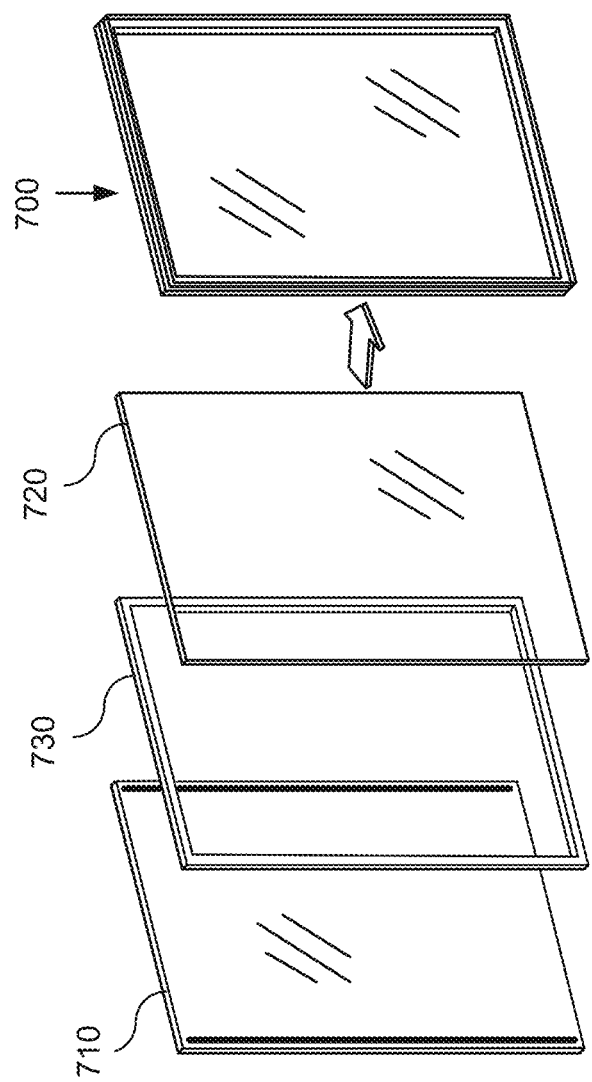
FIG. 7 depicts an electrochromic (EC) window lite, or IGU or laminate, with a transparent display.

In some embodiments, windows may be equipped with transparent display technology where the display is located in the viewable region of the window is substantially transparent under certain conditions (e.g., when the display is in an "off" state) or when the window is viewed from a certain perspective. One embodiment, depicted in FIG. 7, includes an electrochromic (EC) window lite, or IGU or laminate, combined with a transparent display. The transparent display area may be co-extensive with the EC window viewable area. An electrochromic lite, 710, including a transparent pane with an electrochromic device coating thereon and bus bars for applying driving voltage for tinting and bleaching, is combined with a transparent display panel, 720, in a tandem fashion. In this example, electrochromic lite 710 and display panel 720 are combined using a sealing spacer, 730, to form an IGU, 700. The display panel 720 may be a standalone lite for the IGU, or be, e.g., a flexible panel laminated or otherwise attached to a glass lite, and that combination may be the other lite of the IGU. In typical embodiments, the display panel 720 is, or is on, the inboard lite of the IGU, for use by the building occupants. In other embodiments, an electrochromic device coating and transparent display mechanism are combined on a single substrate. In other embodiments, a laminate, rather than an IGU, are formed from 710 and 720, without a sealing spacer. When the EC pane and the transparent display are both in their clear state, IGU 700 appears and functions as a conventional window. Transparent display 720 may have some visually discernable conductive grid pattern but otherwise is transparent, and can be uni- or bidirectional in the display function.

The transparent display can be used for many purposes. For example, the display can be used for conventional display or projection screen purposes, such as displaying video, presentations, digital media, teleconferencing, web-based meetings including video, security warnings to occupants and/or people outside the building (e.g., emergency response personnel) and the like. The transparent display may be configured to provide various types of information about windows or the building via, e.g., a graphical user interface. In certain embodiments, the transparent display (and associated controller) is configured to show specific information about the window being used (the one displaying the information), information about a zone in which the window resides, and/or information about other particular windows in the building. Depending on user permissions, such information could include information in all windows of a building or even multiple buildings. The transparent displays (and associated controller) may be configured to allow monitoring and/or controlling optically switchable windows on a window network. The transparent display can also be used for displaying controls for the display, the electrochromic window, an electrochromic window control system, an inventory management system, a security system, a building management system, and the like. As discussed elsewhere herein, in certain embodiments, the transparent display can be used as a physical alarm element that is used to, e.g., detect a broken window or provide alarm instructions to building occupants and security personnel.

The display may be permanently or reversibly attached to the electrochromic window. The electrochromic window may include an electrochromic lite, an electrochromic IGU, and/or a laminate including an electrochromic lite, for instance. In some cases, it may be advantageous to include a reversible and/or accessible connection between the display and the window such that the display can be upgraded or replaced, as needed. A display lite can be either inboard or outboard of the electrochromic device. It is noted that any of the embodiments herein can be modified to switch the relative positions of the display lite and the electrochromic EC device. Moreover, while certain figures show an electrochromic window that includes a particular number of lites, any of these embodiments can be modified such that the electrochromic window includes any number of lites (e.g., an EC IGU may be replaced with an EC lite or EC laminate, and vice versa).

Figure 8:
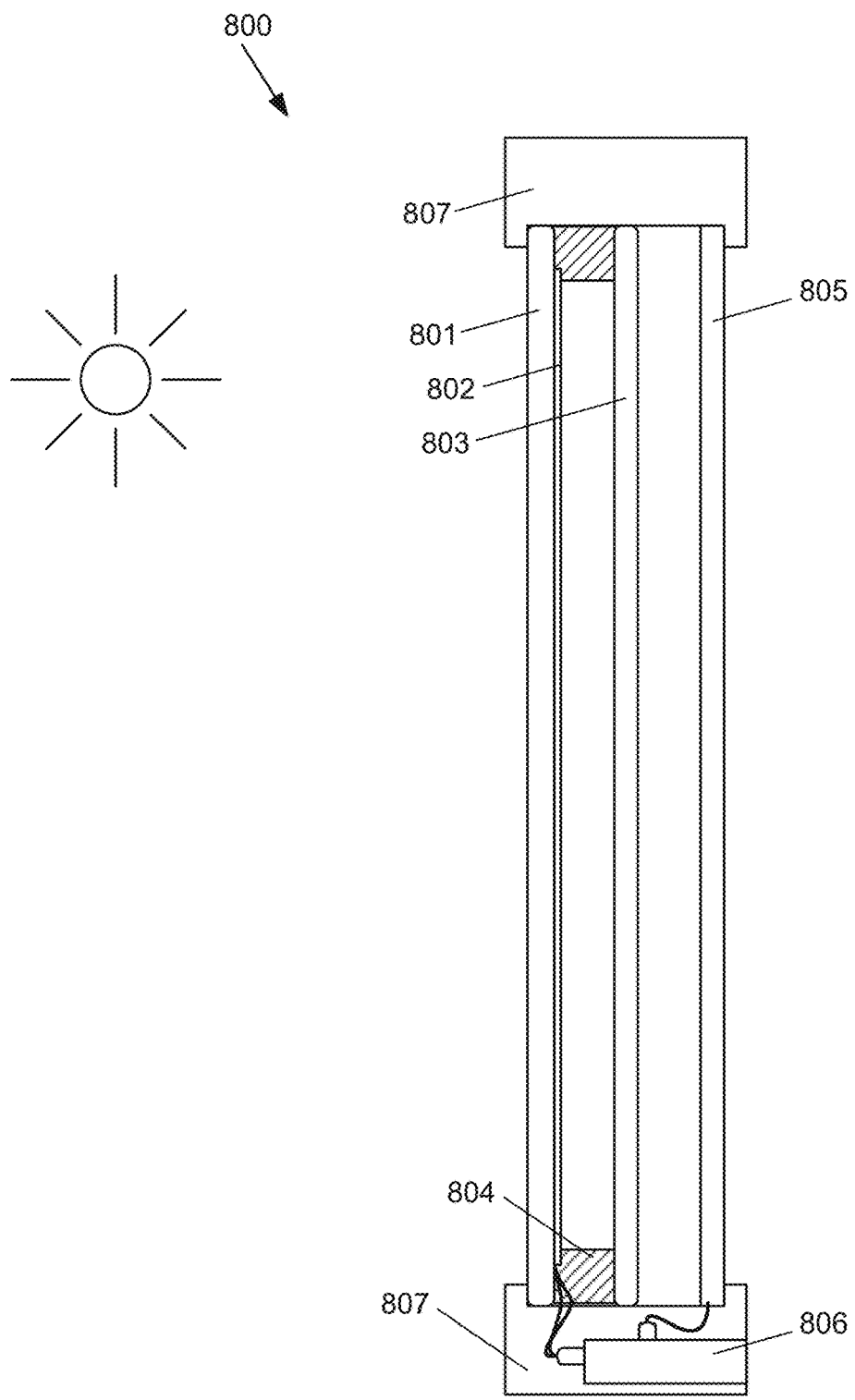
FIG. 8 depicts an IGU with a transparent display.

FIG. 8 shows an example of an electrochromic window 800 that includes an electrochromic IGU (including electrochromic lite 801 with electrochromic device 802 disposed thereon, second lite 803, and an IGU spacer 804 separating the electrochromic lite 801 from the second lite 803), and a display lite 805. A controller 806 is housed in the framing

807 that surrounds and/or supports the electrochromic window 800. Controller 806 includes electrochromic window control functions as well as display control functions. These functions may be independent or coordinated, depending on the need. For example, activating the display may override a tint setting of the electrochromic window if a higher contrast is desired for the displayed information, a privacy mode is desired for the displayed information, the displayed information is desired to be seen by persons outside the building, etc.

In certain embodiments, the transparent display, alone or in conjunction with the electrochromic device, can be used for privacy applications. For example, an electrochromic device can be adjusted to a dark tint state to reduce light transmission, and a transparent display (e.g., an electrowetting display) can be turned to an opaque tint state so that outsiders cannot see into the building or room and observe the occupant's activities. In some cases, a transparent display that emits light, such as an OLED display, can be used to distract an outsider or otherwise make it more difficult for an outsider to see into a building or room. In some cases, transparent displays (for privacy, signage, and other applications) can be located on a separate film or a separate lite spaced apart from the defining interior and exterior lites of an IGU.

In this example, the display lite 805 is reversibly mounted to the electrochromic IGU through the framing 807. If and when the display lite 805 is to be removed and replaced, the framing 807 can be uninstalled, allowing the display lite 805 and the electrochromic IGU to be separated from one another and from the framing 807. This may involve unplugging a connection between the display lite 807 and the controller 806 (or in other cases, between the display lite 807 and another portion of the window such as the EC lite 801 or EC device 802). A new display lite can then be provided along with the electrochromic IGU within the framing 807, and the unit can be re-installed in the building. In some cases, a second spacer (sometimes referred to as a display spacer, not shown) may be provided between the second lite 803 and the display lite 805. The second spacer may be used to ensure a uniform distance between the second lite 803 and the display lite 805, and, in some embodiments, create a hermetically-sealed volume between the display lite 805 and the second lite 803 of the electrochromic IGU. In other embodiments, the framing 807 supports and provides the appropriate spacing between the EC window and the display. There may be sealing elements (not shown) in framing 807 to prevent dust from entering the volume between display 805 and the EC IGU.

In some cases, the display and the EC window may be controlled in tandem to enhance user experience. For instance, the display may be controlled in a way that takes into account the optical state of the EC window. Similarly, the optical state of the EC window may be controlled in a way that takes into account the state of the display. In one example, the EC window and display may be controlled together in order to optimize the appearance of the display (e.g., such that the display is easy to see, bright, readable, etc.). In some cases, the display is easiest to see when the EC window is in a darkened tint state. As such, in some cases, the EC window and display may be controlled together such that the EC window goes to a relatively dark tint state when the display is used, or when the display is used and certain conditions are met (e.g., with respect to timing, weather, light conditions, etc.).

In some embodiments, a first controller may be used to control the optical state of the EC window, and a second controller may be used to control the display. In another embodiment, a single controller may be used to control both the optical state of the EC window and the display. The logic/hardware for such control may be provided in a single controller or multiple controllers, as desired for a particular application.

In certain cases, a transparent display is an organic light emitting diode (OLED) display. OLED displays or similar (TFT, etc.) components of the EC IGU may have other applications besides providing dynamic graphical content. For example, OLED displays can provide general illumination. A dark window on a winter night simply looks black or reflects the interior light, but by using an OLED display, the surface can match the color of an interior wall. In certain embodiments, the transparent display component of the IGU is used to augment or replace conventional lighting in interior spaces (or exterior spaces if the display is bi-directional). For example, OLED displays can be quite bright, and therefore can be used to light up a room (at least to some degree) as an occupant walks into the space at night (with occupancy sensing). In another embodiment, the transparent display component is used to provide a color controlled light for an art gallery at a museum, e.g., a length of EC glass on one side of a wall used to illuminate artwork on the opposite wall.

In certain embodiments, a window may use an electrowetting transparent display technology. An electrowetting display is a pixelated display where each pixel has one or more cells. Each cell can oscillate between substantially transparent and substantially opaque optical states. Cells make use of surface tensions and electrostatic forces to control the movement of a hydrophobic solution and a hydrophilic solution within the cell. Cells can be, e.g., white, black, cyan, magenta, yellow, red, green, blue, or some other color in their opaque state (determined by either the hydrophobic solution or the hydrophilic solution within the cell). A colored pixel may have, e.g., a cyan, magenta, yellow cells in a stacked arrangement. Perceived colors may be generated by oscillating the cells of a pixel (each cell having a different color) at specific frequencies. Such displays may have many thousands or millions of individually addressable cells which can produce high-resolution images. In some embodiments, an electrowetting display may be configured to turn a transparent window into a partially or substantially reflective screen on which images can be projected. For example, cells may be white and reflective in their opaque state. In embodiments where the pixels of an electrowetting display are configured to transition between optical states simultaneously (e.g., to provide a projection screen or a privacy screen) a monolithic electrode may span the dimensions of an IGU and a voltage may be applied to the electrode so that the cells transition optical states at the same time. In some cases, a projector located within a mullion or somewhere else within the room can be used to project an image onto the display. In some embodiments, an electrowetting display may be configured to display black pixels. In some embodiments, images can be seen on an IGU by contrasting black or colored pixels with the lighter backdrop of an exterior environment to create a viewing experience similar to that of a heads-up display. This may be useful if a user does not want to obscure a view provided by an IGU. In some cases, the tint of an electrochromic window may be manually or automatically adjusted (e.g., to account for glare) to create a high contrast image that is also comfortable to look at.

In some cases, a window may have a pixelated or monolithic passive coating that is substantially transparent to an observer but is configured to reflect an image from a projector located, e.g., within a mullion, transom, or somewhere else in the room. In some cases, the passive coating or layer includes a light guide that directs light from a projector along the surface of the glass to the location which it is reflected. Transparent display technology is further described in International Patent Application No. PCT/US18/29476, filed May 25, 2018, and titled "DISPLAYS FOR TINTABLE WINDOWS," which is herein incorporated by reference in its entirety.

Sensors

Tintable windows as described herein are often equipped with various sensors that may be used, for example, to monitor environmental conditions, monitor occupancy, and receive user input. Sensor input can be used to provide automatic control of a window or provide information for controlling other building systems. Sensors may be located on the surface of a tintable window, attached to the framing structure of a window, attached to a controller on the window network, or otherwise in communication with one or more controllers on a window control network (e.g., via a wired or wireless connection). In some cases, a window may have sensors on only one side of a window, and in some cases, a window may have sensors on both sides of a window (e.g., to monitor an interior and exterior temperature).

In some cases, a window may be equipped with motion sensors located on or within mullions and/or transoms to monitor for occupancy and/or receive user input. For example, motion sensors may receive user input related to a graphical user interface on a transparent display. The motion sensors may include one or more cameras to detect user motion (e.g., the motion of a user's hand) and image analysis logic may determine a user's interaction based on the detected motion. For example, image analysis logic may determine whether a user's motion corresponds to a gesture used to provide a specific input. In some cases, one or more cameras may be infrared cameras. In some cases, the motion sensors may include ultrasonic transducers and ultrasonic sensors to determine user motion. In some cases, a window may be equipped with a capacitive touch sensor (e.g., on S1 or S4) that at least partially covers the visible portion of the window and receives user input when a user touches the surface of the window. For example, a capacitive touch sensor may be similar to that found in touchscreens of personal electronic devices such as tablet computers, smartphones and the like. In addition to motion sensors, an optically switchable window may also be equipped with a microphone located in a mullion or transom for receiving audible user input. In some cases, a microphone may be located on a remote device and voice recognition logic may be used to determine user input from received audio. In some cases, audio may be recorded on a remote device and transmitted wirelessly to a window controller. Examples of systems that provide a voice-controlled interface for controlling optically switchable windows are provided in PCT Patent Application PCT/US17/29476, filed on Apr. 25, 2017, which is herein incorporated by reference in its entirety. When a window may be configured to receive audible user input, a window may also be configured with one or more speakers for providing information to a user. For example, a speaker may be used respond to a user inquiry or to provide various features that may be controlled by the user. In some cases, a projector such as an Xperia Touch™, manufactured by Sony Corporation, may be attached to or near the IGU, e.g., in a mullion or on a wall or ceiling nearby, in order to project onto an IGU to display information to the user and provide an on-glass control function. Further examples of using sensors for receiving user input are described in International Patent Application No. PCT/US18/29476, which has been incorporated by reference in its entirety.

In some embodiments, an IGU may be equipped with environmental sensors for air quality monitoring. For example, in some cases, sensors can monitor particulate matter in the air. In some cases, an IGU may be able to sense one or more of the six criteria pollutants (carbon monoxide, lead, ground-level ozone, particulate matter, nitrogen dioxide, and sulfur dioxide) that are monitored by the US national ambient air quality standards (NAAQS). In some cases, IGUs may be equipped with sensors for detecting less common pollutants if there is a specific safety concern at an installation site. For example, in a facility for semiconductor processing, sensors may be used to monitor for fluorocarbons or to detect chlorine gas. In some cases, a sensor may detect carbon dioxide levels as a form of occupancy sensor, e.g., to aid window control logic to determine heating and cooling needs of the interior environment. Additional examples of sensors for monitoring air quality are described in International Patent Application No. PCT/US18/29476, which has been incorporated by reference in its entirety.

In some cases, a window may have light sensors, temperature sensors, and/or humidity sensors. These sensors may provide feedback to intelligence logic used to control tintable windows in order to maintain preferred environmental conditions. In some cases, windows may make use of rooftop sensors such as are described in International Patent Application No. PCT/US16/55709, filed Oct. 6, 2016, which has been incorporated herein by reference in its entirety, which provides additional description of sensors on a window network.

In some cases, sensors are located on or associated with on glass controllers which are described in U.S. patent application Ser. No. 14/951,410, titled "SELF-CONTAINED EC IGU" and filed on Nov. 24, 2015, which was previously incorporated by reference in its entirety. In some cases, a sensor is located on a frame, mullion, or adjacent wall surface. In certain embodiments, sensors in mobile smart devices may be used to aid in window control, e.g., as inputs to window control algorithms when sensors are available in smart devices also having window control software installed.

Detection of a Damaged Tintable Window

Tintable windows on a window control network can be used to provide a building security platform. For example, as discussed in greater detail herein, a window controller or other processing device can monitor for window breakage, cameras associated with windows can monitor for intruders, and transparent displays can provide alerts regarding detected activity within a building. Windows are located on the skin of a building and are common targets for potential intruders, as they are often the weakest portion of a building's skin. When protecting against theft and other unwanted forms of intrusion, windows are generally a primary concern as they are easily broken. When a window controller is configured to detect when damage has occurred and/or when a tintable window is outfitted with deterrent mechanisms then windows can be a security asset rather than a vulnerability. In some cases, windows can be leveraged to reduce a security risk posed by other entrances to a building. For example, cameras used to detect user motion may also detect and capture an intruder break in. In some cases, a window control system can reduce or eliminate the need for a conventional security system and save costs in new building construction or in building renovation. In some cases, the window control system can double as a security network that can detect security threats, communicate security-related information, and respond to detected security threats.

Security Monitoring During Normal Window Operation

Electrochromic windows can be monitored for damage during normal operation by monitoring the electrical properties (e.g., monitoring the current or voltage) of the EC device coating via the window controller and determining that the electrical properties are outside an acceptable range and/or are changing over time at an unacceptable or unexpected rate. If the current needed to provide a voltage drive signal is different than expected, or if the voltage differs from an expected value when applying a known current, this may be indicative that damage has occurred. If a window is damaged, an increased resistance across the EC device coating may be detected, and in some cases, e.g., if a tempered window is shattered, the electric circuit passing through the window may be completely broken (i.e., resembling an open circuit).

During normal operation of the tintable window, various electrical parameters can be monitored including (i) current during a tint transition, (ii) voltage during a tint transition, (iii) open circuit voltage ($V_{OC}$), and/or (iv) current while $V_{OC}$ is measured. Such electrical parameters may depend on the window type or the window size. In some cases, these values may be determined based on window testing performed before the window left the factory. In some cases, the expected electrical parameters may depend on the number of tint cycles that a window has undergone. In some cases, a window controller is programmed with threshold values for one or more monitored electrical characteristics that specify acceptable upper and/or lower limits of electrical characteristics for a window. In some cases, acceptable limits for electrical parameters are based a monitored history of electrical parameters. For example, if the performance of a window slowly changes over the window's lifetime, then the acceptable limits for electrical parameters (can be adjusted accordingly. In some cases, acceptable limits for electrical properties are based on a deviation from a previous measurement or set of measurements. In some cases, a window controller may update the acceptable limits over the window's life cycle based on, e.g., the number of tint cycles a window has undergone and the monitored electrical data collected during normal operation of the window. In some cases, the window control system may monitor the health of a window as a function of the monitored electrical parameters. If the window control system determines that a window is nearing the end of its life cycle, has a defect, or is exhibiting an electrical abnormality, the window control system may generate a service request for the window to be inspected. In some cases, a field systems engineer (FSE) may be able to pull up a report on a mobile device to see a window's condition when it left the factory, see a record of window maintenance and reported issues, and see a history the window's performance based on the measured electrical parameters. Software applications and methods for monitoring window health information diagnosing defects in a window control system are further described in International Patent Application No. PCT/US17/62634, which has been incorporated by reference.

Examples of approaches to making security-related determinations during normal operation of optically switchable windows will now be described. Depending on, e.g., the preferences of a building administrator, window controllers can be configured to make these security-related determinations every second, every few seconds, or at intervals of 0.5, 1, 2, 5, or 10 minutes to ensure that windows of the building are still intact and have not been breached by an intruder. Among the contexts for making such determinations are (1) normal tint transitions of a window, (2) monitoring progress of a tint transition such as described in U.S. Pat. No. 9,885,935 issued Feb. 6, 2018, previously incorporated herein by reference, (3) fixed tint states during which a transition is not occurring, and (4) start-up modes in which the window controller may operate in a "$V_{oc}$-only" mode.

During normal tint transitions of a window for example, I/V characteristics may be measured. Where, for example, the current needed to provide a voltage drive signal is different than expected, or if the voltage differs more than expected when applying a known current, a security-related determination may be made. For example may be determined that a broken window has resulted in an increased resistance, or an open circuit. The expected I/V characteristics may be based on as-delivered window characteristics or on updated window characteristics (e.g., a comparison of current I/V characteristics to past I/V characteristics; update expected I/V characteristics to be the current I/V characteristics). To compensate for changes or degradation of the window, a security event detection may be based on a deviation from current I/V characteristics (as opposed to a deviation from an earlier I/V characteristics, e.g., when window was fabricated or installed). As a result, current health information of one or more windows may be provided. The window I/V characteristics may be measured, analyzed, and updated either locally or remotely, e.g., by a site monitoring system. Use of machine learning and data collection may be contemplated in order to improve detection algorithms.

Monitoring the progress of a tint transition may include open circuit voltage (Voc) measurements made when a new tint command is received while the window is still in transition. Voc may indicate the charge stored between the EC and CE layers in the IGU. If a window is expected to be in a dark tint state (e.g., tint state 2, 3, or 4), and Voc is smaller than an expected value for such tint state, provide an indication of a broken or malfunctioning window may be provided. When relying only on a Voc measurement alone, a Voc criteria may need to be above a certain threshold because of noise in measurement circuitry. In some implementations current measurements may be made concurrently with Voc measurement. Current measurement may be especially useful when the window is in a clear or nearly clear state.

During fixed tint states (i.e., when a transition is not occurring) steady state leakage current and/or Voc may be measured. A sudden change in measured current while holding at a particular tint state may indicate that the window is partially or fully broken. For example, a minor fracture in annealed glass might be sufficient to short circuit EC layers resulting in a current spike. If a portion of the glass is broken, the current will decrease. In the case of tempered glass in a situation where the glass shatters, the leakage current might drop to zero. In some cases, an expected leakage current should be above a threshold voltage to account for noise in measurement circuitry, i.e., not suitable for fully clear state.

Finally, during a start-up mode, open circuit voltage may be used to measure the charge stored between the EC and CE layers in the IGU. On initialization or start-up, Voc may normally be small and an appropriate threshold value may be smaller than when the EC window is in an operational tint state or tint transition. For example, where a $V_{OC\ Target}$ has been selected for an operational tint state or tint transition, a threshold value of $1/n^*V_{OC\ Target}$ (with $n \geq 2$, for example) may be selected for use at times prior to or upon initialization of an EC window.

The electrical characteristics of a window (e.g., the measured current and voltage data) may be measured and analyzed by the window controller responsible for applying a tint transition. In some cases, electrical data measured by a window controller is transmitted to an upstream controller in the window network for analysis. For example, with reference to FIG. 6, electrical data can be transmitted to an intermediate network controller 604 or a master network controller 602 for analysis. If the upstream controller then determines that adjusted threshold values are needed, the updated values defining expected electrical parameters can be pushed to the respective downstream window controller. In some cases, measured electrical data is analyzed by a remote network 609 such as a cloud-based computing platform. In some cases, the data is analyzed by a monitoring system which may also monitor the electrical performance of windows in other buildings. Such monitoring systems can use machine learning techniques (e.g., by making use of user reported incidents) from many windows across a plurality of site locations to improve detection algorithms. Site monitoring systems for monitoring the performance window control systems are further described in U.S. patent application Ser. No. 15/691,468, Filed Aug. 30, 2017, and titled "MONITORING SITES CONTAINING SWITCHABLE OPTICAL DEVICES AND CONTROLLERS," which is herein incorporated by reference in its entirety.

In some cases, detection of a broken or damaged window is based at least in part on open circuit voltage ($V_{OC}$) and/or charge count (Q) measurements taken during normal window operation in addition to or instead of measuring leakage current. Charge count Q refers to an amount of charge accumulated on an electrochromic layer of an EC device and may be obtained by integrating drive current over time, for example. $V_{OC}$ refers to the voltage across the EC device coating after a defined period has passed since applying open circuit conditions. A $V_{OC}$ measurement is representative of the electric charge stored between the electrochromic and counter electrode layers in the EC device coating. As described previously, by temporarily removing the drive voltage to simulate open circuit conditions during a tint transition, $V_{OC}$ measurements can be used to determine how far the window is in the tint transition process. In some cases, $V_{OC}$ can be helpful to determine what drive voltage or current should be applied when a window controller is interrupted mid-transition with a command to adjust the tintable window to a different tint state. If a window is in transition and expected to be in a dark tint state (e.g., TS 2, TS 3, or TS 4), $V_{OC}$ measurements that are smaller than expected may be an indication of a damaged or broken window. Expected $V_{OC}$ values may depend on the type of tint transition occurring (e.g., whether the transition is from TS 1 to TS 2, or from TS 2 to TS 4) or the time since the transition was initiated. In some cases, current measurements taken concurrently with $V_{OC}$ measurements can be used to confirm whether the monitored electrical behavior is indicative of a damaged or broken window. In some cases, current measurements taken during tint transitions can be used alone to determine whether a window is damaged. Current measurements may be helpful, e.g., at substantially clear states where little to no charge is stored between the electrochromic and counter electrode layers of the EC device coating.

In some cases, the steady state leakage current through an EC device coating can be used to determine if damage has occurred. For example, a sudden change in the measured leakage current may indicate that the window has been partially or fully broken. If there is a spike in the monitored leakage current (during steady-state conditions), this may be indicative of a short in the EC device coating caused by, e.g., a minor fracture of an annealed glass substrate. If a portion of the glass is broken, the current will decrease, and if a tempered glass substrate shatters, then the leakage current may drop to zero. Monitoring for leakage current to determine damage to the EC device requires that the hold voltage applied to the window is at least above a threshold voltage (generally occurring to a tinted optical state) that depends on, e.g., the size of the window and the sensitivity of measurement circuitry. Advantageously, the above-described techniques for detection of a broken or damaged window may be executed without perturbing an apparent optical state of the optically switchable window (i.e., without causing a change in the optical properties of the window that is visually apparent to a casual observer) and/or without perturbing a process of driving a transition of the optically switchable window between optical states.

In some cases an absolute value of a measured current may be compared to a specified value, for example, an expected current response (e.g., 10 mA). The expected current response may be adjustable by, for example, the window controller, the network controller, the master controller, or a combination thereof. In addition, or alternatively, in some implementations, the current response may be monitored or sampled at periodic intervals. Then, a determination that damage has occurred may be made when a change in the measured current over a period of time (e.g., over a number of samples) is observed. For example, a currently measured leakage current may be compared with a previously measured leakage current, and a determination made based on a difference between the measured values.

In low tint states, or substantially clear tint states, the expected leakage current may be extremely small, and in some cases, below the noise level of the measurement circuitry, making leakage current monitoring problematic for detecting damage. In such cases, irrespective of when they arise during a window's operating profile, the present disclosure may contemplate measuring window $V_{OC}$ and/or Q, for example. For example, determining whether the optically switchable window is broken or damaged may include, first, comparing the measured leakage current against an expected leakage current of the optically switchable window. The expected leakage current may be an adjustable parameter that may be set or adjusted from time to time by one or more of a window controller, a network controller, and a master controller. The expected leakage current may be or may be based on a previously measured leakage current of the optically switchable window. If the measured current exceeds the expected value, a determination may be made that the optically switchable window is not broken or damaged. If the measured current does not exceed the expected value, determining whether the optically switchable window is broken or damaged may include, second, a further step of measuring one or both of $V_{OC}$ and/or Q. If one or both of the magnitudes (absolute values) of measured $V_{OC}$ and Q exceeds a respective threshold value, the window may be regarded as undamaged, notwithstanding that leakage current is very small. The respective threshold values may be selectable by one or more of the window controller, the network controller, and the master controller.

In some cases, different threshold values may be selected at different phases of window operation. For example, prior to or upon initialization of an EC window, or after a prolonged period during which the EC window is idle and in a substantially clear state, a threshold value for $V_{OC}$ may be selected that is considerably smaller than the threshold value selected at other times. For example, where a $V_{OC\ Target}$ has been selected for some operational modes, a threshold value of $1/n*V_{OC\ Target}$ (with n≥2, for example) may be selected for use at times prior to or upon initialization of an EC window, or after a prolonged period during which the EC window is idle and in a substantially clear state.

Continuous Security Monitoring

Previously discussed methods that rely on normal window operation to generate a detectable current/voltage signal may not be suitable for continuous 24-7 security monitoring. For example, when the EC device is idle and in a substantially clear state, neither the current nor the voltage across the EC device may be sufficient to determine whether damage has occurred. Typically, windows may be left in a cleared state at night and during at least some portions of the day, which means there may be security vulnerabilities during these times. To mitigate this problem, an electrical transient (that may be referred to as a "security perturbation"), can be applied to the EC device coating independently of any electrical transients used for normal tint control. The security perturbations may be configured to generate sufficient current and/or voltage data for security monitoring applications. Monitoring via the security perturbations can be done apart from or in conjunction with the described techniques that rely on window use.

In some cases, a security perturbation involves applying a voltage and/or current to a window in a similar manner to when a tint transition is initiated, but the voltage and/or current is only applied for a short period, for example about one minute or less, and does not change or visibly perturb an apparent optical state of the window (i.e., does not cause a change in the optical properties of the window that is visually apparent to a casual observer). In some cases, a perturbation results in an optical density (OD) change in the window that is less than, e.g., 0.3, 0.2, or 0.15. In some cases, voltage and/or current profiles for perturbations are determined for a particular window during a testing and calibration process that occurs before a window leaves a manufacturing site to verify that any tinting resulting from applied perturbations is subtle enough to go unnoticed. Methods of calibrating windows tint levels based on OD measurements, which can be used in calibration voltage and/or current profiles for security perturbations are described in International Patent Application No. PCT/US17/28443, filed Apr. 19, 2017, and tiled "CALIBRATION OF ELECTRICAL PARAMETERS IN OPTICALLY SWITCHABLE WINDOWS," which is herein incorporated by reference in its entirety. When a security perturbation is applied (e.g., a voltage/current ramp or pulse) one or more of the following electrical characteristics may be monitored: the leakage current during the security perturbation, the voltage during the security perturbation, the $V_{OC}$ after the security perturbation is applied, the voltage before the security perturbation, and the leakage current before and/or after the security perturbation.

In some cases, a voltage profile is applied to the EC device coating (e.g., a voltage ramp or constant voltage). The current response can be monitored to see whether it deviates from an expected current response and/or a corresponding $V_{OC}$ measurement can be used to determine if damage has occurred. For example, an absolute value of a measured current may be compared to a specified value, for example, an expected current response (e.g., 10 mA). The expected current response may be adjustable by, for example, the window controller, the network controller, the master controller, or a combination thereof. In addition, or alternatively, in some implementations, the current response may be monitored or sampled at periodic intervals. Then, a determination that damage has occurred may be made when a change in the measured current over a period of time (e.g., over a number of samples) is observed. For example, a currently measured leakage current may be compared with a previously measured leakage current, and a determination made based on a difference between the measured values. In some cases, a current profile is applied to the EC device coating, and the voltage response to the applied current profile is monitored. In some cases, a slope of the ramp may be selectable by one or more of a window controller, a network controller, and a master controller. For example, for relatively small windows (area less than 1 square meter, for example) or relatively cold for external temperatures (less than 0° C., for example), it may be desirable to provide a steeper ramp in order to obtain a larger and/or faster current response.

In some cases, a security perturbation may be a modified version of a voltage profile used to change the window tint state under normal window operation (see, e.g., FIGS. 3 and 4) or a voltage profile used by a portable IGU testing device. Portable IGU testing devices are described in International Patent Application No. PCT/US17/66486, filed Dec. 14, 2017, and titled "TESTER AND ELECTRICAL CONNECTORS FOR INSULATED GLASS UNITS," which is herein incorporated by reference in its entirety. In some cases, a security perturbation may include various features of a drive profile used for tint transitions including voltage ramps, voltage holds, current ramps, and current holds. In some cases, features of a typical drive profile used for a security perturbation can be compressed, truncated, or scaled in magnitude. For example, a hold voltage may be shortened or removed since it is not desirable for the security perturbation to cause a noticeable change in tint. When a tintable window is at rest and in a substantially clear optical state, security perturbations can be applied the EC device coating periodically to verify that no damage has occurred. Depending on, e.g., the preferences of a building administrator, window controllers can be configured to apply security perturbations every second, every few seconds, or at intervals of 0.5, 1, 2, 5, or 10 minutes to ensure that windows of the building are still intact and have not been breached by an intruder. In some cases, a building administrator can specify a custom interval at which perturbations are applied. In some cases, the frequency of security perturbations may be increased if, e.g., an infrared camera detects movement outside a window, or a first indication of a window break is recognized. In some cases, a security perturbation may be applied for about 10-30 seconds, 5-10 seconds, or in some cases, less than 5 seconds. In some cases, such as when security perturbations are applied at frequent intervals, perturbations may be followed by a reverse signal to balance the charge on the EC device coating. Alternatively, or in addition, a time interval between checks may be reduced when there is a first indication of an anomaly such as a window break, for example. As an example, if the normal pulsing interval is 30 s, if an anomaly is detected, then a subsequent check may be initiated within a shorter interval (for example, 10 seconds). In the absence of detecting an anomaly, the normal pulsing interval (in the present example, 30 seconds) may be maintained.

In some cases, a security perturbation may be applied as a square, a sawtooth, or a sinusoidal waveform to the electrochromic device. Drive voltages for tint transitions are typically between about 2-4 V, but ample current data can generally be collected at much lower voltages. For example, a security perturbation may involve applying a 600 mV on-off voltage to the electrochromic device. With advances in monitoring circuitry improvements in noise reduction, security perturbations may involve even lower voltages, e.g., less than 300 mV or less than 100 mV. In some cases, an oscillating charge profile is applied having an offset so that the security perturbation can be applied continuously without creating a charge imbalance and causing tinting of the EC device.

In some implementations, applying a security perturbation involves applying a high-frequency signal to the transparent conducting layers of the EC device. The dimensions, materials, and other properties of a tintable window create a unique frequency abortion spectrum. The frequency absorption spectrum for an EC device coating can be measured as the impedance across the EC device as a function of the frequency of the applied signal. If the window develops a crack or is otherwise damaged, the frequency absorption spectrum will change as a result of the structural change. When a high-frequency signal is applied, it may be applied as a frequency sweep spanning a large range of frequencies. For example, the high-frequency signal can sweep frequencies between about 1 Hz-1 kHz, between about 1 kHz-1 MHz, and in some cases, frequency ranges greater than 1 MHz. For each frequency sweep, an impedance measurement is collected for a plurality of frequencies such that a characteristic frequency absorption spectrum can be determined.

Figure 9:
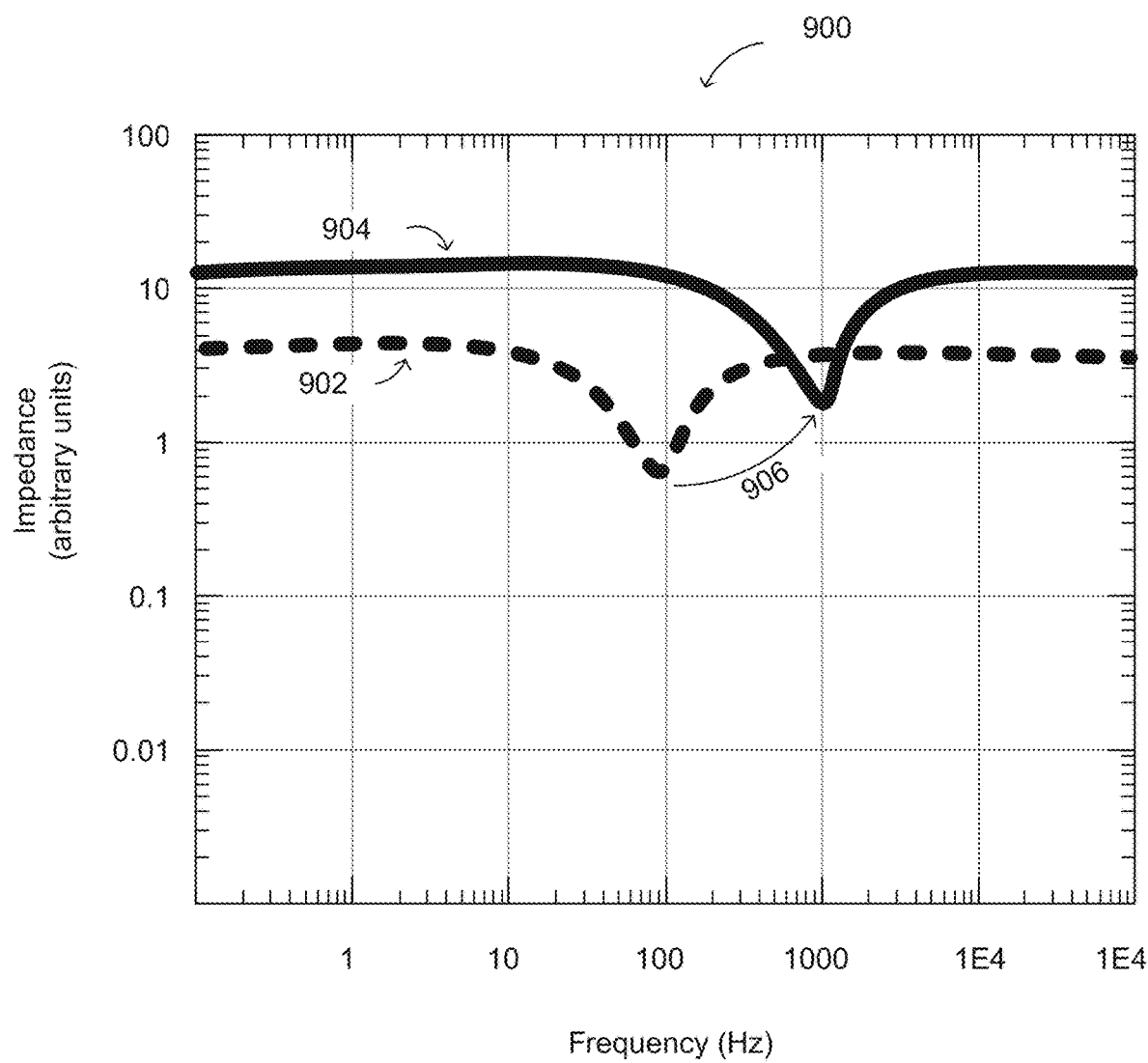
FIG. 9 illustrates how frequency abortion spectrum measurements of an EC device coating can be used to detect window damage.

FIG. 9 depicts an illustrative frequency absorption spectrum 900 for a tintable window. A first plot 902 shows a frequency absorption spectrum for an intact and fully functional window. A second superimposed plot 904 shows a frequency absorption spectrum for the window after it has been damaged. In this illustrative example, after receiving damage, an increased impedance across the EC device coating is seen across the device across all frequencies. This may indicate that a portion of the window has been broken out. In some cases, the impedance may be lessened across all frequencies if, e.g., the EC device is short-circuited. When a tintable window is broken or damaged, a shift 906 in one or more peaks and/or valleys (i.e., local maximums or local minimums) in the frequency absorption spectrum may be observed. Security logic used to determine whether a window has been damaged may consider whether a local peak or/valley has reached a threshold magnitude, whether a local peak or/valley has shifted by a threshold frequency, and/or whether there has been a shift in the impedance across a substantial portion of the frequency spectrum.

In some cases, a high-frequency security perturbation component may be applied on top of a drive or hold signal used in normal window operation. In some cases, a high-frequency security perturbation signal may be applied periodically between drive or hold signals. Generally the amplitude of the high-frequency security perturbations signal is a fixed voltage, however, this need not be the case. The magnitude of a high-frequency perturbation signal may vary depending on the window type; the magnitude need only to be large enough to be distinguished from noise in by the monitoring circuitry. So long as a high-frequency signal does not add charge to the EC device over time, it can be applied continuously; however, in some cases, it can be applied periodically.

Continuous monitoring via application of security perturbations may be controlled by, e.g., a window controller, network controller, a master controller, or a combination thereof. Generally, a local window controller is responsible for applying security perturbations and detecting whether damage has occurred by monitoring the electrical response resulting from security perturbations and/or the electrical response resulting from normal window operation. When the local window controller is configured to detect window damage my based on the electrical response of a window, it can reduce network traffic imposed on the window control network; raw electrical data can be processed locally, rather than having to be transmitted to another controller for analysis. In some cases, a window controller may be responsible for application of security perturbations and measurement of electrical responses, but the decision to issue a security perturbation and/or the analysis of the electrical response may be performed by an upstream controller (e.g., a network controller or a master controller) or a remote site monitoring system.

Figure 10:
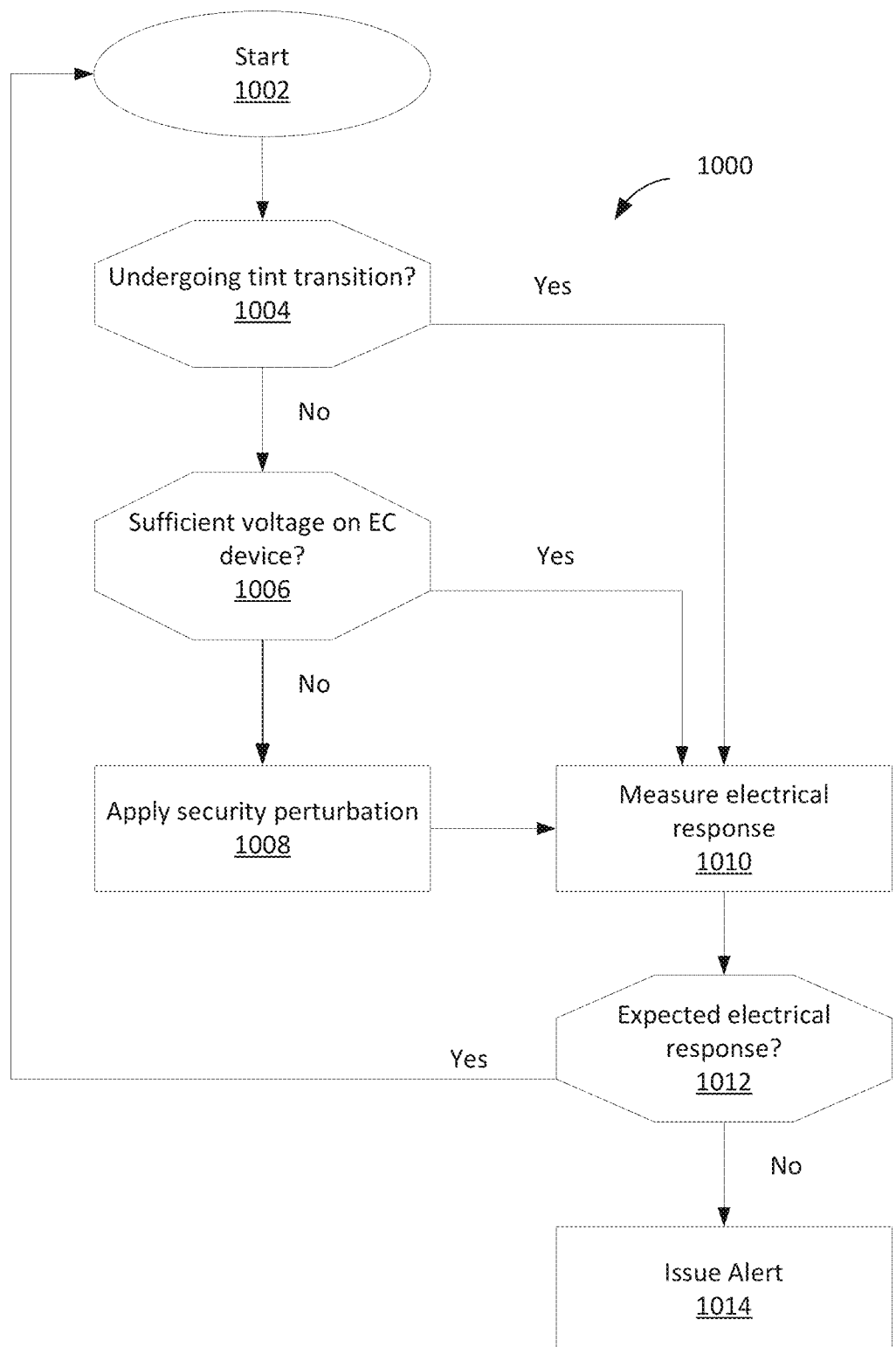
FIG. 10 is a flowchart depicting a method can be used to provide continuous or substantially continuous security monitoring of a tintable window.

FIG. 10 is a flowchart depicting a method 1000 that a window controller can use to provide continuous (or substantially continuous) security monitoring of a tintable window. After starting the process, 1002, the window controller first determines whether the tintable window is undergoing a tint transition, block 1004. If the window is undergoing a tint transition, the electrical response of the window can be monitored, block 1010, by, for example, measuring the (i) current during tint transition, (ii) voltage during tint transition, (iii) open circuit voltage ($V_{OC}$), and/or (iv) the current while $V_{OC}$ is being measured. If it is determined at block 1004 that the window is not undergoing a tint transition (i.e., the window is being held at a particular tint state), the window controller may then determine, at block 1006, whether there is a sufficient voltage on the EC device coating to monitor an electrical response. This may depend, for example, on the tint state the window is being held at. For example, TS 2, TS 3, and TS 4 may provide a sufficient voltage to the EC device for security monitoring while TS 0 and TS 1 may be insufficient. If it is determined that there is a sufficient voltage applied to the EC device, the leakage current may be measured at block 1010. If there is not a sufficient voltage across the EC device coating, then the window controller may apply, at block 1008, a security perturbation to the EC device periodically and/or continuously to in order to better measure the electrical response, block 1010.

After an electrical response is measured in operation 1010 (e.g., due to a tint transition, steady-state conditions, or a security perturbation), the response is analyzed, at block 1012, to determine whether the response is within a range of expected responses. If the response is within an expected range, the process may restart, at 1002. If it is determined that the electrical response is outside an expected range, the window may be considered to be damaged and an alert may be issued, block 1014 as described elsewhere herein.

In some cases, building security can be enhanced by the use of additional sensors in communication with the window control system. Data provided by sensors can be used to, e.g., augment or validate methods of detecting window damage as described herein or determine other safety threats.

In some cases, sensors may be located on a tintable window or the framing structure of a tintable window. In some cases, a sensor may utilize a 1-wire bus system conventionally used in many EC windows to receive power and transmit information to a window controller. A 1-wire bus may, e.g., provide about 3.3 volts and about 10 mA to a window sensor. In some cases, a 1-wire bus may have five wires, and at least one of wires is used for communicating with a sensor. Such 1-wire bus systems are further described in U.S. patent application Ser. No. 13/449,251, and U.S. patent application Ser. No. 15/334,835, both of which have previously been incorporated by reference. In other embodiments, sensors may wirelessly communicate with a window controller and/or wirelessly receive power.

In some embodiments, a window sensor includes a conductive feature that spans at least a portion of the viewable region of the tintable window. A conductive feature may be, e.g., an antenna structure, a transparent display, or a capacitive touch sensor on the surface of the glass. When conductive features are located on the glass surface, damage can be detected when there is a change in the resonant frequency of those features. This can be done, e.g., in the manner previously described for monitoring the frequency absorption spectrum for an EC device coating. If the conductive feature forms a circuit, damage to the window can be detected by determining that the circuit has been broken.

In some cases, an IGU includes a gas sensor that measures the gas pressure within the interior volume (see, e.g., 208 in FIG. 2). The interior volume of an IGU is typically held at a positive pressure, and if it observed that the gas pressure within the interior region has decreased below a threshold value or has decreased beyond a threshold rate, this can be used as in indication of damage to the IGU. In some cases, gas pressure can be monitored using an absolute pressure sensor. In some cases, the gas pressure can be measured using a differential pressure sensor such as a MEMS diaphragm based sensors. In some cases, a differential sensor can monitor the gas pressure differential between the interior volume of an IGU and the indoor air pressure. In some cases, a differential sensor can monitor the gas pressure differential between the interior volume of an IGU and the outdoor air pressure. In some cases, an IGU includes more than one differential pressure sensor such that the gas pressure between the interior volume of the IGU, the environments on both sides on an IGU can be related.

Figure 11:
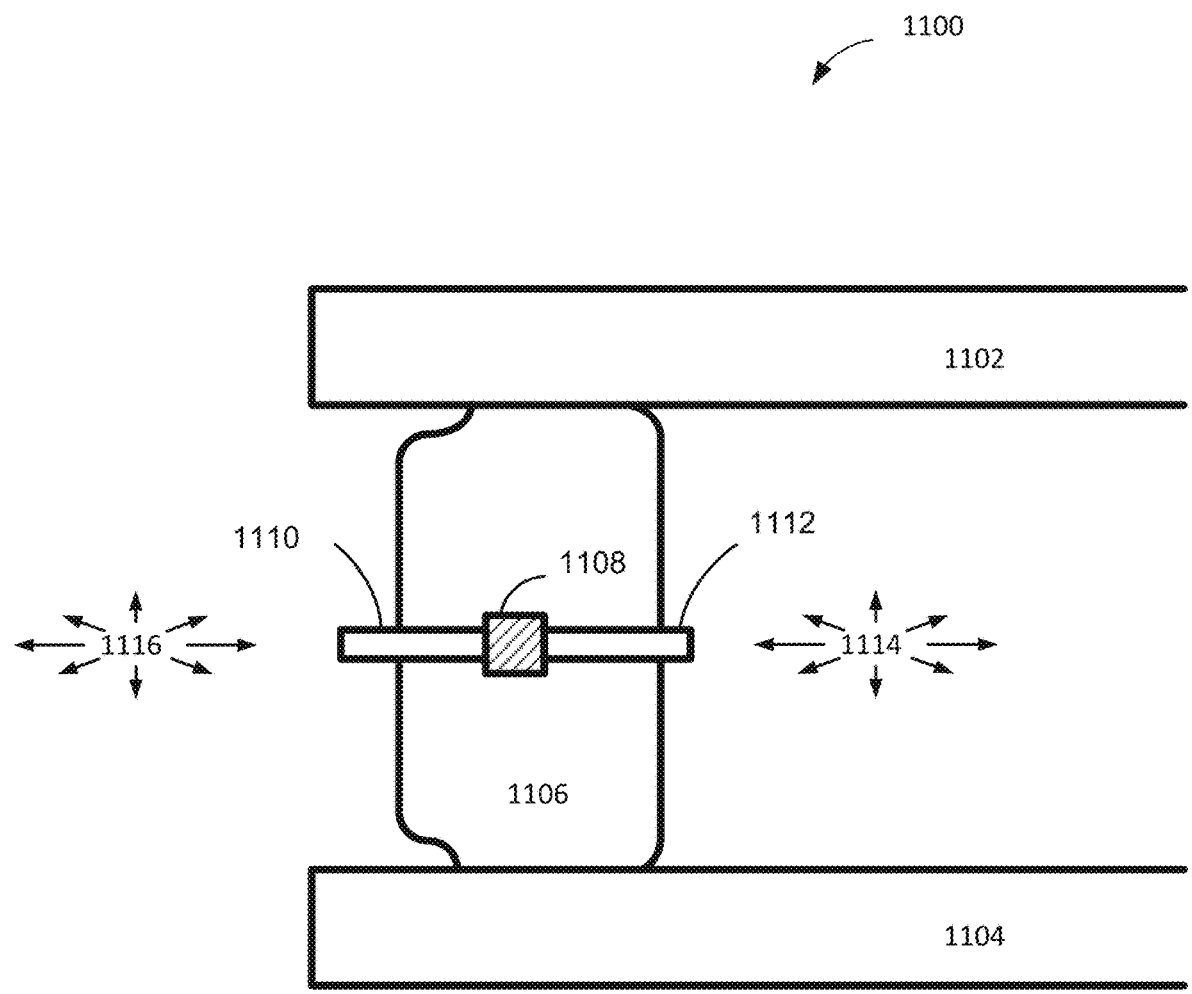
FIG. 11 depicts an IGU with a differential pressure sensor which may be used to detect a broken window.

FIG. 11 depicts one implementation of a differential gas sensor 1110 in an IGU 1100. The IGU 1100 has inner and outer lites (1102 and 1104) with a hermetically sealed spacer 1106 between the two lites that separates the interior volume 1114 from an exterior environment 1116 (i.e., an indoor environment or an outdoor environment). Spacer 1108 has a differential gas sensor 1108 that measures the pressure differential between the interior volume 1114 and the exterior environment 1116 via capillary tubes 1110 and 1112 exiting the spacer. Depending on how a window is installed, capillary tube 1110 may measure an indoor gas pressure or an outdoor gas pressure.

In some cases, a tintable IGU may make use of one or more gas sensors, as described elsewhere herein, for the purpose of air quality monitoring. In some cases, an IGU includes one or more gas sensors that are configured to monitor the concentration of argon gas, or another inert gas placed within the interior volume of the IGU when manufactured. If a window is broken, the break can be detected via a decrease in the concentration of argon gas (or another gas) within the interior region, and/or increase in the concentration of other gases such as nitrogen within the interior region. To monitor the concentration of one or more gas species within the interior volume, gas sensors (e.g., a metal oxide or an electrochemical gas sensor) may be located on the interior lite surface (e.g., S2 or S3). In another case, a gas sensor can be located on or within a spacer (see, e.g., spacer 1106 in FIG. 11). If located within the spacer, a gas sensor may have, e.g., a tube connecting the sensor to the interior volume of the IGU.

As described above, a tintable window may also have a microphone or other acoustic sensor. In some cases, a sensor may be used to receive user input. A microphone or acoustic sensor can also be used to look for an acoustic signature of broken glass. In some cases, a microphone is located within a window controller. In some cases, a tintable window has, e.g., a piezoelectric sensor attached or bonded to a surface of a lite to measure shock.

In some cases, a window may include an optical sensor to determine whether a window has been broken or breached by an intruder. For example, an IGU may have a laser located within the spacer that directs a focused light beam to a photoreceptor that is also located in the spacer, but on the other side of the viewable region. If, e.g., an intruder attempts to break and climb through the window the optical circuit is tripped, and an alert can be issued.

In some cases, as described previously, a window or window controller includes cameras as occupancy sensors. In some cases, a controller on the window network paired to the camera is configured to detect user motion or movement. In some cases, detected movement can result in security perturbations being provided to an EC device more frequently and/or continuously for a period of time.

In some cases, thermal information can be used to help determine whether a window has been broken. In some cases, tintable windows, or the window control system, can be configured to monitor inside and outside temperatures. If there is a large temperature differential between an interior and the exterior environment, a sudden decrease in the temperature differential (e.g., a decrease that does not coincide with, an open door) may be used to corroborate other information indicating that a window has broken.

In some cases, a window controller may be equipped, e.g., with an accelerometer or gyroscope to provide inertial data. Inertial data may be helpful in determining a security threat, e.g., if a window can be slid into an open position or located on a glass door.

Security logic operating on a window controller or on a window control network can, in some cases, detect a broken window based on a measured electrical response of the window and data provided via one or more additional sensors as described herein. The use of additional sensors can provide an increased reliability to security detection methods. In the event that one sensing methods malfunctions (e.g., an IGU connector becomes unplugged, disconnecting a window controller from the EC device coating) then other methods may still be capable of detecting a broken window. Multiple sensing methods further allow for data fusion techniques which can be used to more accurately determine if and to what extent a window is damaged, and how the security threat should be classified. In some cases, data from multiple sensors can be used to, e.g., validate a determination that a window is damaged, and in some cases, the use of additional sensors can be used to determine that one sensor is not functioning properly. In some cases, the use of multiple sensors may be used to track an intruder within a building. For example, an intruder may be tracked using microphones, cameras, infrared sensors, ultrasonic sensors, and determining the location of a mobile device they carry (e.g., a cell phone).

Examples of approaches to making security-related determinations outside the normal operation of optically switchable windows will now be described. In some implementations. A perturbation may be applied to one or more tenable windows, the perturbation appearing similar to the first part of a tint transition, while avoiding a not noticeably change window tint state. In connection with the perturbation, I/V characteristics may be monitored, including one or more of the following: leakage current during perturbation, voltage during perturbation, Voc determined because of perturbation, voltage before/after perturbation, and leakage current/ before or after perturbation. For example, in one implementation, a voltage (e.g., a voltage ramp or constant voltage) may be applied and a resulting current response may be monitored. For example, during an applied voltage profile, the system may measure Voc. A security-related determination may be based on Voc measurements and/or the current response to the applied voltage profile. In another implementation, a current profile may be applied that does not significantly change the tint state, and a resulting voltage response may be monitored.

Such implementations may use a tester waveform such as described elsewhere herein (see e.g., International Patent Application No. PCT/US17/66486, previously incorporated herein by reference in its entirety) for a duration of, e.g., 5 or 10 seconds. Advantageously, perturbations may have a duration that avoids producing a detectable tint variation. For example a perturbation may be chosen so that transition results in an optical density change that is not detectable or easily detectable by the human eye. In some embodiments, the perturbations may be applied periodically when a window is in fixed tint state, e.g., every 2, 5, or 10 minutes. A perturbation might stop after a short period of time (e.g., after about five seconds or about one minute) before reversing the drive signal. In some implementations, steps may be taken to ensure that charge is balanced.

In some embodiments perturbations may include applying a square or sawtooth voltage wave (the latter waveform being easier in some instances for the current/voltage source). The amplitude of the voltage wave may be, e.g., a millivolt range of on/off voltage (or tens of millivolts or hundreds of millivolts). For example, where a normal drive voltage is between about 2-4 V, a, smaller drive voltages may be employed, e.g., about 600 mV may be sufficient to provide ample current data.

In some embodiments a shift in frequency absorption and/or IGU impedance vs. frequency may be checked. The structure of an IGU (dimensions, materials, etc.) gives it a unique frequency abortion spectrum to an applied AC drive signal. When there is a failure or break within the window, then the frequency absorption spectrum changes as a result of the structural change. An AC signal, for example, may be applied on top of a drive or hold signal. The signal may be applied periodically between drive or hold signals. The amplitude of the AC signal may be a fixed voltage sufficient to produce enough current distinguishable from noise. The AC signal may be applied continuously or periodically, so long as the window is powered. The AC signal, advantageously, sweeps a large range of frequencies, e.g., 1 Hz-1 kHz, 1 kHz-1 MHz. Changes in the frequency absorption profile may be detected, for example, by noting a threshold dB change at a particular frequency and/or a shift in an attenuation peak frequency.

Monitoring at times other than normal operation may be controlled by the Master Controller (MC), Network Controller (NC), Window Controller (WC), etc. IGU perturbations may, advantageously, be controlled locally by a WC. This may reduce the communication load on the MC/window network that would otherwise require a constant flow of communication signals. An example logic may conclude that if a window is not in transition AND window voltage is below a critical threshold, then apply perturbation and monitor a response (i.e., take advantage of normal IGU driving signals when sufficient, and if IGU driving signal is insufficient then apply a perturbation signal).

Responses and Deterrent Mechanisms:

If a window controller determines that damage has occurred to a tintable window, the damage can be reported to other controllers on the window control network including, e.g., network controllers and master controllers. In some cases, a broken or damaged window can be communicated via a BACnet interface conventionally used as a backbone for window control networks. In some cases, a master controller can report a broken window to a site monitoring system or a network operations center.

In some cases, a window control system can be configured so that a broken or damaged window triggers an alert. For example, an alert may be provided to the local police or a security guard. An issued alert may indicate, e.g., that the window on the first floor on the east side of a building has been broken and that there are two intruders. In cases where security personnel are alerted, geofencing techniques may be used to determine which security personnel are the closest to the broken window and are responsible for investigating the situation.

In some cases, in addition to, or independent of an alert, a window control system is configured to automatically generate a return merchandise authorization (RMA) order notification upon detection of window breakage or a window malfunction. In some cases, the window control system can be configured to automatically generate a service/case record to a service center or technician, to a subject window installation site manager, and/or to a customer service/ project manager assigned to the site, one or more of which who can then more efficiently coordinate replacement of a broken or a malfunctioning window. RMA generation in this manner allows orders for windows to be quickly entered into a window suppliers supply chain, can facilitate faster service and repair, and can provide improved customer satisfaction. In some cases, an intervening step of review by a user can be required prior to automatic generation of an RMA and/or a service/case record. In some cases, the window control system can be configured to generate an alarm in the form of an alert action. The alert action may cause one or more of the following to be performed automatically and/or without interaction of a human: ordering a replacement optically switchable window, notifying a window supplier to ship a replacement optically switchable window, notifying an optically switchable window repair technician to repair the window, notifying a manager of a building in which the optically switchable window is installed that there is an issue related to the window, notifying monitoring personnel to open a service case/record, and generating an RMA.

In certain cases, windows with transparent displays can be used as a physical alarm element or a deterrent mechanism. A transparent display can, alone or in combination with the electrochromic lite, be used as a breakage detection sensor. In some cases, a transparent display can be used as a visual alarm indicator, e.g., displaying information to occupants and/or external emergency personnel. For example, a map of the building may be displayed that highlights what window has been broken, what actions have been taken (e.g., what doors are locked), and what response is appropriate for a building occupant (e.g., should the occupant stay put or evacuate the building). In some cases, if a potential intruder is detected outside a building (e.g., using a camera), a transparent display may be used to warn the potential intruder that they are being watched.

In some cases, an alarm may trigger a change in lighting. For example, if it is determined that a broken window corresponds to a burglary event, the lights in the corresponding room can be turned on or changed to a different color to indicate where the intruder is. In some case, the lighting in other rooms may be dimmed to help security personnel know where an intruder is. In some case, a building may be equipped with one or more safe rooms for building occupants where the lighting is turned off. In some cases, exterior lighting can be turned on, or a ring sensor light on the rooftop of a building can be turned on. In some cases, an alert can trigger a lighting response provided via one or more transparent displays in a building (e.g., transparent OLED displays which can be used to provide lighting). In one embodiment, a transparent display can be used to flash a warning message (e.g., the entire transparent display pane may flash brightly in red) to indicate trouble and be easily seen. For instance, a large window flashing in this manner would be easily noticeable to occupants and/or outside personnel. In another example, one or more neighboring windows may indicate damage to a window. For example, in a curtain wall where a first window has four adjacent windows, breakage to the first window triggers one or more of the four adjacent windows to flash red or display large arrows pointing to the first window, to make it easier for occupants or external personnel to know where the trouble is. In a large skyscraper, with many windows, it would be very easy for first responders to see four windows adjacent a central window flashing, i.e., forming a flashing cross to indicate where the trouble is located. If more than one window is broken, this method would allow instant visual confirmation of where the trouble lies. In certain embodiments, one or more transparent displays may be used to display a message to first responders, indicating both the location and nature of the emergency. It may be breakage of one or more windows or indicate, e.g., hotspots within the building for firefighters. In some embodiments, the windows may be responsive to signals from emergency personnel such as police or other first responders. For example, in recent years public buildings where civilians gather such as schools, churches, clubs, have been targeted by armed assailants ("active shooters"), and the present techniques may be adapted to assist first responders to such incidents. For example, windows may, responsive to signals from the first responders, be caused to change tint state. First responders may be enabled to more quickly determine the locations of assailant(s) and/or victim(s) using information provided by windows equipped with acoustic sensors, IR or vision cameras and/or motion sensors. In some embodiments, a first responder may cause a window to display a "shelter in place", "evacuate" or "all clear" message, for example.

In some cases, an alarm can trigger a tint change in one more windows of a building. For example, the windows near a damaged window (and in some cases, the damaged window itself) may be adjusted to a clear state to help security personnel in locating an intruder. In some cases, other windows of a building (e.g., interior windows) may be darkened to protect building occupants from being viewed by an intruder. In cases, where windows have electrowetting displays, displays may be set to an opaque state to protect building occupants from being viewed by an intruder.

Examples of contexts and processes for security-related responses and deterrent mechanisms will now be described. In some embodiments a security-related condition alert may be reported to a Master Controller. The condition alert may be reported over BACnet interface, for example and may be used to trigger an alarm and/or may be forwarded to a Network operations center (NOC). The alert/notification may be displayed on-glass, e.g., on an adjacent window. In some embodiments, alert/notification of an intruder may be generated whether or not a glass is broken, for example based on, e.g., capacitive sensors, IR cameras, etc. One or more windows incorporating a transparent display may be configured to display a photograph/video of an intruder. The master controller and/or the NOC may be configured to take further action such as alerting police, alerting an appropriately located security guard, using geotracking, for example. Advantageously, any alert may include the specific location of the broken IGU and/or intruder.

Additional actions may include notifying a site operations team to open a service case/record, generate an RMA order, and or alert one or more of a site customer service manager, project manager, building manager, window supplier, and service technician. Yet further actions may include adjusting building illumination, locally or globally. For example, lights in a room with a broken IGU may be turned on or lights in another room may be darkened to make it easier to see where intruder is. As a further example, the building may have lights darkened in a safe room. As still further examples, exterior building lighting may be turned on and/or a ring sensor light on the top of the building may be turned on. In some implementations, an IGU may include LEDs that flash when the IGU is broken. The LEDs may be powered by capacitors, in some instances.

Yet further actions may include changing tint state of one or more windows. For example windows surrounding the intrusion site (and, if possible, the broken window) may be cleared so as to improve ability to see where the intruder is located. Alternatively, surrounding windows (and, if possible, the broken window) may be darkened so as to protect building occupants from being viewed by intruder.

Finally, the master controller, the NOC and/or the BMS, may be configured to lock doors to room with so as to onfine an intruder to a portion of the building.

Conclusion:

Although the foregoing disclosed embodiments have been described in some detail to facilitate understanding, the described embodiments are to be considered illustrative and not limiting and it will be apparent that certain changes and modifications may be practiced within the scope of the appended claims. It should be noted that there are many alternative ways of implementing the processes, systems, and apparatus of the present embodiments. One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure. Thus, the present embodiments are to be considered as illustrative and not restrictive, and the embodiments are not to be limited to the details given herein.

What is claimed is:

1. A method of detecting breakage in an optically switchable window, the method comprising:
 (a) applying a current or voltage to the optically switchable window; and
 (b) measuring an electrical response to the current or voltage applied in (a) to determine whether the measured electrical response is consistent with breakage of the optically switchable window;

wherein (a) is performed irrespective of a current tint state or a current transition between tint states of the optically switchable window and the optically switchable window is not visibly perturbed as a result of (a).

2. The method of claim 1, further comprising:
(c) in response to detecting the response in (b), performing a security action.

3. The method of claim 1, wherein measuring the electrical response is performed while the optically switchable window is undergoing a transition from a first tint state to a second tint state.

4. The method of claim 1, wherein measuring the electrical response includes measuring an open circuit voltage of the optically switchable window.

5. The method of claim 4, wherein measuring the open circuit voltage of the optically switchable window is performed while the optically switchable window is undergoing a transition from a first tint state to a second tint state.

6. The method of claim 1, further comprising comparing the electrical response measured in (b) with an expected current or voltage for driving the transition between tint states and/or for maintaining an end optical state of the optically switchable window.

7. The method of claim 6, wherein the expected current or voltage is a previously measured current or voltage for driving the transition between optical states and/or for maintaining the end optical state of the optically switchable window.

8. The method of claim 6, wherein measuring the electrical response of the optically switchable window is performed while the optically switchable window is in the end optical state.

9. The method of claim 1, wherein measuring the electrical response of the optically switchable window includes measuring a leakage current of the optically switchable window and comparing the measured leakage current against an expected leakage current of the optically switchable window.

10. A system comprising:
one or more interfaces for receiving sensed values for an optically switchable device of an optically switchable window; and
one or more processors and memory configured to perform a method of detecting breakage in an optically switchable window, the method comprising:

(a) applying a current or voltage to the optically switchable window; and
(b) measuring an electrical response to the current or voltage applied in (a) to determine whether the measured electrical response is consistent with breakage of the optically switchable window;
wherein (a) is performed irrespective of a current tint state or a current transition between tint states of the optically switchable window and the optically switchable window is not visibly perturbed as a result of (a).

11. The system of claim 10, wherein the method further comprises:
(c) in response to detecting the response in (b), performing a security action.

12. The system of claim 10, wherein measuring the electrical response is performed while the optically switchable window is undergoing a transition from a first tint state to a second tint state.

13. The system of claim 10, wherein measuring the electrical response includes measuring an open circuit voltage of the optically switchable window.

14. The system of claim 13, wherein measuring the open circuit voltage of the optically switchable window is performed while the optically switchable window is undergoing a transition from a first tint state to a second tint state.

15. The system of claim 10, wherein the method further comprises comparing the electrical response measured in (b) with an expected current or voltage for driving the transition between tint states and/or for maintaining an end optical state of the optically switchable window.

16. The system of claim 15 wherein the expected current or voltage is a previously measured current or voltage for driving the transition between optical states and/or for maintaining the end optical state of the optically switchable window.

17. The system of claim 15, wherein measuring the electrical response of the optically switchable window is performed while the optically switchable window is in the end optical state.

18. The system of claim 10, wherein measuring the electrical response of the optically switchable window includes measuring a leakage current of the optically switchable device and comparing the measured leakage current against an expected leakage current of the optically switchable window.

* * * * *